United States Patent [19]
Willmot

[11] Patent Number: 5,685,794
[45] Date of Patent: Nov. 11, 1997

[54] TRANSMISSION MECHANISM

[75] Inventor: Eric Paul Willmot, Stoneyfell S.A., Australia

[73] Assignee: Aimbridge Pty. Ltd., Melbourne, Australia

[21] Appl. No.: 432,196

[22] PCT Filed: Aug. 5, 1994

[86] PCT No.: PCT/AU94/00445
§ 371 Date: May 5, 1995
§ 102(e) Date: May 5, 1995

[87] PCT Pub. No.: WO95/06829
PCT Pub. Date: Mar. 9, 1995

[30] Foreign Application Priority Data

Aug. 30, 1993 [AU] Australia ............... PM 0912

[51] Int. Cl.⁶ .................. F16H 29/16; F16H 29/18; F16H 29/20; F16H 48/16
[52] U.S. Cl. ................................ 475/170; 74/117
[58] Field of Search ............... 74/117, 118; 475/170, 475/207

[56] References Cited

U.S. PATENT DOCUMENTS 4,712,450 12/1987 Takamiya et al. ............... 475/170
4,732,054 3/1988 Takamiya et al. .
4,916,974 4/1990 Kozakae et al. ............... 475/170
4,983,151 1/1991 Pires ............................. 475/170
5,029,486 7/1991 Mercat .
5,048,358 9/1991 Shook ............................. 74/117
5,454,766 10/1995 Mills .............................. 74/117

*Primary Examiner*—Dirk Wright
*Attorney, Agent, or Firm*—Barnes, Kisselle, Raisch, Choate, Whittemore & Hulbert, P.C.

[57] ABSTRACT

A transmission is disclosed which has an input power supply (53, 34, 328) and a plurality of secondary members which are driven by the input power supply. The secondary members can be in the form of pawls (344, 361) or rack and pinion arrangements (54, 56). An infinitely variable gear ratio adjustment mechanism which can adjust the gear ratio between a maximum and minimum ratio is provided and generally comprises a fixed inner eccentric (318) and a movable outer eccentric (320). The outer eccentric (320) can be moved to adjust the eccentricity of the eccentrics to thereby set the gear ratio to any ratio between the minimum and maximum. The pawls (344, 361) or racks and pinions (54, 56) are arranged on the eccentrics (318, 320) and are driven by the input for only part of each revolution of the input other than when the gear ratio is set as 1:1. A mechanism for ensuring that the load applied to the secondary members is distributed between at least two of the secondary members at any one time is provided and comprises a lever arrangement (106), a floating ring arrangement (76) or a resilient biasing rubber ring (380, 382).

31 Claims, 18 Drawing Sheets

TRANSMISSION MECHANISM

The present invention relates to transmission mechanisms, and preferably to transmission mechanisms capable of providing infinite variation in the drive ratio between the input and output.

Infinitely variable transmissions which operate on a friction principle are well known. One such transmission comprises a vee-belt and pulley system. The pulleys are each split into two frusto-conical portions which are movable axially towards or away from each other so as to vary the effective pulley diameter at which the belt contacts the pulley. The major problem with this and other friction transmissions is that they are unable to transmit high torques, at least without making a transmission of excessive size as to be impractical.

A requirement accordingly exists for a variable ratio transmission which is able to transmit high torques in a practical manner. Transmission systems capable of coping with large torque loads in relatively small units, are inevitably based on rigid body elements such as gears formed in metals. This poses great problems for infinitely variable transmissions, and no practical system exists at this time.

There is disclosed in my patent application PCT/AU81/00146 an infinitely variable mechanical transmission. Basically, this mechanism comprises means for transforming a circular input motion into non-circular periodic motion of a plurality of elements, or iterated operations of a single element, utilising only a part of the periodic motion of each element and transforming this part back into a rotary output motion. These parts of the periodic motion of the plurality of elements are connected or "assembled" sequentially to provide the output motion. This process is what is termed "motion transformation" and results in so-called "torque conversion".

In the transmission disclosed in the above patent application, rotary motion of an input shaft is converted by an eccentric of variable eccentricity into a periodic motion of a plurality of racks. The periodic motion of each rack is converted into a rotary periodic motion of a pinion, and a selected part of the motion of the pinion is applied to a separate satellite gear of a planetary gear arrangement. The resultant output motion of a sun gear of the planetary gear arrangement is effected by the sequential action of each satellite gear. More specifically each rack operates in sequence to apply part of its motion to is associated satellite gear and thus to the output sun gear, a switching device being incorporated in the mechanism to switch on and off an operative connection between a pinion gear which is continually driven by the rack, and the associated satellite gear. While it may be theoretically possible to achieve either instantaneous switching or precise synchronism between the switching off of the operative connection between one rack and its associated satellite gear and the switching on of the operative connection between the next rack in the sequence and its associated satellite gear, it is not possible in practice to achieve this, and as a result the output will not be completely smooth; this may manifest itself as a slight jerkiness which can be felt in the output while under load. Whereas for some uses this lack of smoothness may be tolerated, for many uses it is necessary to obtain a flat or smooth output.

Thus, attempts to produce rigid body continuous variable transmissions have been based on the production of a plurality of partial intermediate circular or non-circular motions produced by a circular input and at some stage transformed back to a collated circular motion. Pires U.S. Pat. No. 4,983,151 issued Jan. 8, 1991 discloses a mechanism which attempts to provide a smooth output by what Pires terms "averaging intermediate rotations". The device disclosed in Pires requires considerable precision and whilst the output is smoother than the transmission referred to in PCT/AU81/00146, the output still is not sufficiently smooth for many applications.

All of these attempts including my earlier patent application No. PCT/AU81/00146, depended on overlapping kinematic forms of the partial circular or non-circular motions.

An object of a first aspect of the invention is to provide a transmission mechanism in which a flatter or smoother output is provided.

The invention, in a first aspect, may be said to reside in a transmission mechanism including:

- an input power supply means for supplying input rotary power;
- an output power supply means for providing rotary output power;
- a plurality of secondary members arranged between the input power supply means and the output power supply means for transmitting power from the input power supply means to the output power supply means, each of the plurality of secondary members transmitting power through only part of each rotary cycle of the input power supply means; and
- load distributing means for differentially distributing the load taken by the secondary members between at least two of the secondary members at any one time.

Since this aspect of the invention includes the load distributing means which creates a differential load distribution between at least two of the secondary members, the output power is smoother and continuous, rather than jerky, and discontinuous and therefore the transmission of input power to output power is smoother. The load distributing means which differentially distributes the load collapses the kinematic form of the overlapping partial circular or non-circular motions and serially links their associated load functions by differentially distributing the load between the at least two of the secondary members.

In one embodiment of the invention, the plurality of secondary members are sliding pawls which are driven by the input power supply means in sequence and for only part of each rotation of the input power supply means and the output power supply means comprises satellite gears driven by the pawls which in turn drive an output sun gear.

In another embodiment of the invention the plurality of secondary members are pawls coupled to the input power supply means for rotation with the input power supply means and which engage and drive the output power supply means in sequence and for only part of each rotation of the input power supply means to provide output power.

In one embodiment, the load distributing means comprises a lever coupled to each of the secondary members for engaging another of the secondary members so that when load is applied to a secondary member the load is transmitted from that secondary member via the lever to the other secondary member therefore differentially distributing the load between the secondary member and the other secondary member.

Most preferably in this embodiment of the invention the input power supply member comprises a variator and the secondary members comprise a plurality of pawls which are pivotally coupled to the variator. The output power supply member comprising a toothed assembler arranged eccentrically with respect to the variator so that upon rotation of the variator the pawls, in turn, are brought into engagement with the assembler to drive the assembler through part of one rotation of the assembler, the load distributing means comprising a respective lever pivotally coupled to each of the pawls at an end of each pawl remote from the assembler, each lever being pivotally mounted at an intermediate position and having an end for forcing engaging another of the pawls to engage the assembler so that when one pawl engages the assembler and is under load the load is transmitted from that pawl to the lever so that the lever pivots about its intermediate pivot point and forces the other pawl so that the other pawl is brought into engagement with the assembler to share the load between the pawl and the said other pawl.

In another embodiment of the invention the load distributing means comprises a loosely coupled ring, having teeth on its inner and outer circumference, which can rock backwards and forward so as to engage at least two of the secondary members so that the load is distributed between those two secondary members.

In one preferred embodiment of the invention the load distribution means comprises a biasing member which enables movement to occur between the input power supply means and the plurality of secondary members and/or the output power supply means and the plurality of secondary members, said movement being caused by engagement of one of the secondary members with the input power supply means or the output power supply means to cause another of the secondary members to therefore engage with the input power supply means or the output power supply means to thereby load the other secondary member.

Preferably the biasing means comprises a resilient rubber member.

Preferably the transmission includes an infinitely variable gear ratio change mechanism for providing infinite gear ratio alteration between a minimum ratio and a maximum ratio.

Preferably the mechanism comprises a stationary eccentric mounted with respect to the plurality of secondary members such that the plurality of secondary members are able to rotate relative to the eccentric; a movable eccentric arranged for movement relative to the stationary eccentric and the plurality of secondary members such that movement of the movable eccentric alters the eccentricity of the stationary and movable eccentrics to thereby change the gear ratio between the maximum and minimum ratios.

The movable eccentric is preferably an outer eccentric arranged on the stationary eccentric. However, the movable eccentric may be an inner eccentric and the stationary eccentric may be an outer eccentric.

In another embodiment of the invention the input power supply member comprises two toothed assemblers each associated with a plurality of secondary members and the load distribution means comprises a gear system so that when one of the secondary members associated with one of the assemblers is under load the gear system is driven to attempt to rotate the other assembler so that a secondary member associated with the other assembler is placed under load to thereby share the load between the secondary member associated with one of the assemblers and a secondary member associated with the other of the assemblers.

Preferably the secondary members are in engagement with the output power supply member or the input power supply member over a driving zone which is approximately equal to 360÷n° wherein n is equal to the number of pawls.

In a second aspect the invention may be said to reside in a transmission mechanism including:

an input power supply means for supplying rotary input power;

a first assembler;

a second assembler;

a first plurality of secondary members arranged between the input power supply means and the first assembler;

a second plurality of secondary members arranged between the input power supply means and the second assembler;

an output power supply means; and a gearing system arranged between the first and second assemblers and the output power supply means for transmitting power supplied to at least one of the first and second assemblers by a respective one of the first and second plurality of secondary members from the at least one assembler to the output power supply means.

Preferably the gearing system also provides a load distributing means for differentially distributing load applied to the secondary members so that the load is shared between at least two of the secondary members at any one time, and most preferably the first and second assemblers and the gearing system also provides differential motion exchange between the first and second assemblers to provide a smooth output power supply.

Preferably the load is shared between one of the secondary members in the first plurality of secondary members and one of the secondary members in the second plurality of secondary members.

Preferably the first and second plurality of secondary members are each comprised of pawls each of which have a single tooth for engaging the first and second assemblers.

The invention may also be said to reside in a transmission mechanism including:

an input drive member for receiving input rotary power;

a gear ring or a plurality of secondary power supply members coupled to the input drive member;

an output drive member for providing output rotary power;

the other of the gear ring or the secondary power supply members being coupled to the output drive member; and an eccentric member for mounting the gear ring or the plurality of secondary members and which is rotatable to alter the eccentricity of the eccentric member relative to a central axis to thereby change the position of the gear ring with respect of the secondary members to alter the gear ratio between the gear ring and the secondary members.

In one preferred embodiment of the invention, a first gear ring is mounted for rotation with the input drive member, the gear ring having teeth on an inner circumference thereof;

a first plurality of secondary members arranged within the gear ring on the eccentric member for engagement by the teeth of the gear ring when the gear ring rotates so that each of the first plurality of secondary members is engaged by the gear ring for part of each rotary cycle of the gear ring;

a carrier member for carrying the first plurality of secondary members;

a second gear ring carried by the carrier, the second gear ring having teeth on an internal circumference thereof, a second plurality of secondary members arranged within the second gear ring for engagement with the gear ring through only part of each rotary cycle of the secondary gear ring, said second plurality of secondary members being coupled to the output drive member for providing output rotary drive.

Preferably a motion exchange member is arranged between the first gear ring and the input drive member and/or a second biasing member is arranged between the carrier and the second gear ring for allowing movement of the first gear ring and/or second gear ring with respect to the first plurality of secondary members and/or the second plurality of secondary members respectively so that when the first and/or second gear ring is loaded by coming into contact with one of the secondary members, the first and/or second gear ring is able to move to come into contact with another of the secondary members to thereby distribute the motion and hence the load between the first secondary member and the said another of the secondary members so that at least two of the secondary members are loaded at any one time.

In another embodiment of the invention, a gear ring having teeth on an inner circumference thereof is coupled to the input drive member and a first plurality of secondary members are arranged within the first gear ring, the first plurality of secondary members being coupled to a second plurality of secondary members, a second gear ring arranged around the second plurality of secondary members and the second gear ring being coupled by a coupling member to the output drive member for providing output rotary power.

The invention still further provides a transmission mechanism including:

an input power supply for supplying input rotary power;

an output power supply for providing rotary output power;

a plurality of secondary members arranged between the input power supply and the output power supply for transmitting power from the input power supply to the output power supply;

an eccentric member for mounting the plurality of secondary members with respect to the input power supply or the output power supply for setting a drive ratio between the input power supply and the output power supply;

the plurality of secondary members transmitting power through only part of each rotary cycle of the input power supply except for when the drive ratio between the input power supply and the output power supply is 1:1; and load distributing means for differentially distributing the load taken by the secondary members between at least two of the secondary members at any one time.

The invention still further provides a transmission including:

an input power supply for receiving input rotary power;

an output power supply for supplying output rotary power;

a first gear ring coupled to the input power supply for rotation with the input power supply, the first gear ring having teeth on an inner peripheral surface thereof;

an eccentric member for setting a drive ratio between the input power supply and the output power supply;

a pawl carrier mounted on the eccentric member for rotation about the eccentric member, the pawl carrier having a first carrier section and a second carrier section axially and radially outwardly spaced from the first carrier sections;

a first plurality of pawls coupled to the first carrier section of the pawl carrier for engagement by the teeth of the first gear ring for rotating the pawl carrier;

a second gear ring coupled to the second section of the pawl carrier, the second gear ring having teeth on an inner peripheral surface thereof; and a second plurality of pawls coupled to the output power supply for engagement by the teeth of the second gear ring upon rotation of the pawl carrier to thereby rotate the second plurality of pawls and the output power supply.

The invention still further provides a transmission including:

an input power supply for receiving input rotary power;

an output power supply for providing output rotary power;

a first gear ring coupled to the input power supply for rotation with the input power supply, the first gear ring having teeth on an inner periphery thereof;

an eccentric member for setting a drive ratio between the input power supply and the output power supply;

a pawl carrier mounted on the eccentric member and having a first carrier section and a second carrier section axially spaced from the first carrier section;

a first plurality of pawls mounted to the first carrier section of the pawl carrier for engagement by the teeth of the first gear ring for rotating the first plurality of pawls and therefore the pawl carrier;

a second plurality of pawls mounted to the second carrier section of the pawl carrier for rotation with the pawl carrier; and a second gear ring having teeth on an inner periphery thereof for engagement with the second plurality of pawls to thereby rotate the second gear ring, the second gear ring being coupled to the output power supply for providing output rotary power.

The invention still further provides a transmission including:

an input power supply for receiving input rotary power;

an output power supply for providing output rotary power;

a gear ring having teeth on an inner periphery thereof for rotation with the input power supply;

an eccentric member for setting a drive ratio between the input power supply and the output power supply;

a pawl carrier for carrying a plurality of pawls mounted on the eccentric member;

a plurality of pawls mounted on the pawl carrier for engagement by the teeth of the gear ring to drive the pawl carrier, the pawl carrier being coupled to the output power supply for proving the output rotary power.

The invention still further provides a transmission including:

an input for supplying input rotary power;

an output for providing output rotary power;

a first drive member for driving by the input;

a second smaller drive member for driving by the first drive member and for providing an overdrive drive ratio from the first drive member to the second drive member;

a third drive member for driving by the second drive member;

a fourth drive member larger than the third drive member for driving by the third drive member and for also providing an overdrive drive ratio from the third drive member to the fourth drive member.

Preferred embodiments of the invention will be described, by way of example, with reference to the accompanying drawings in which.

Figure 1:
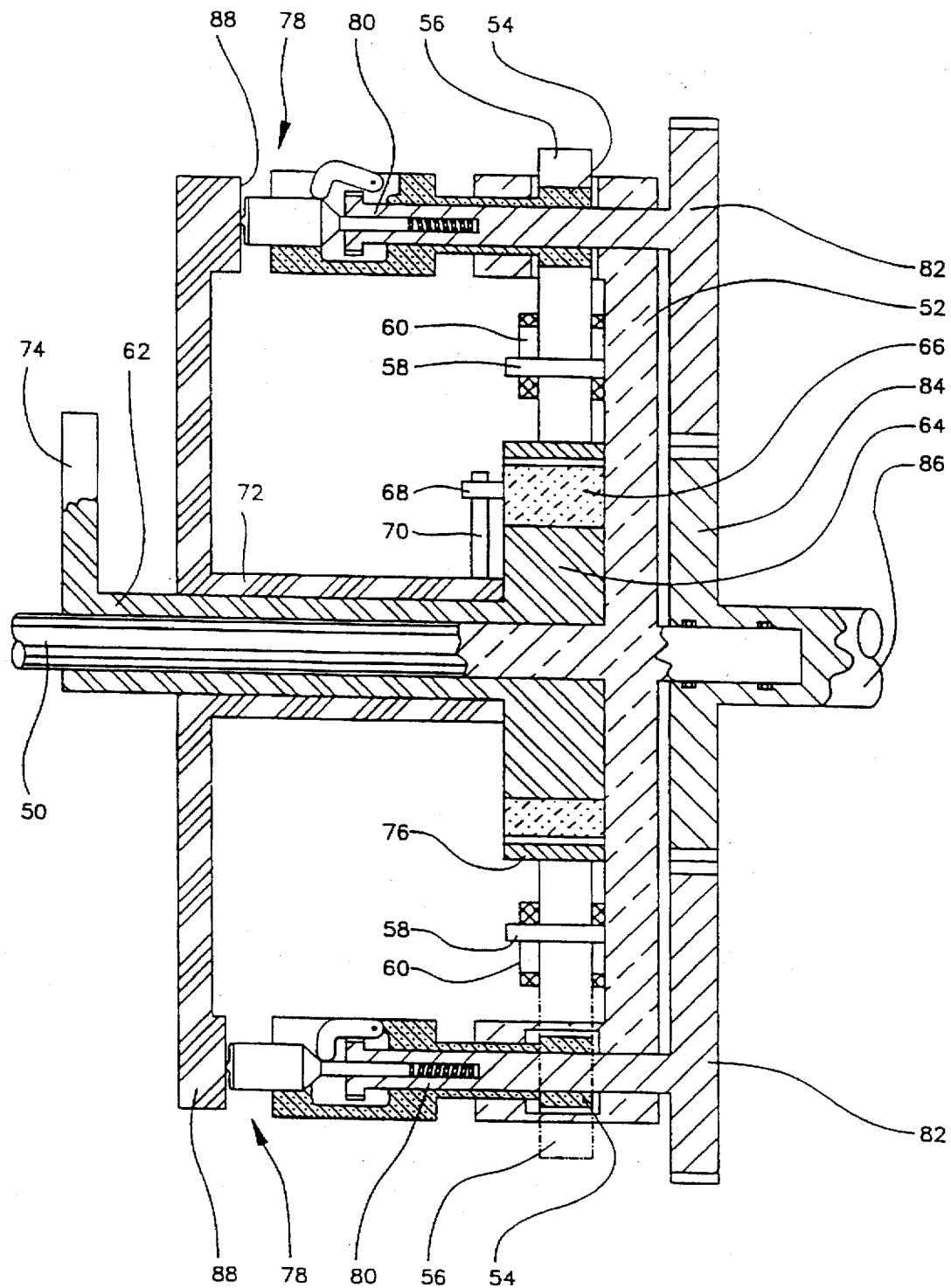
FIG. 1 is a view of a transmission mechanism according to one embodiment of the invention.
Figure 5:
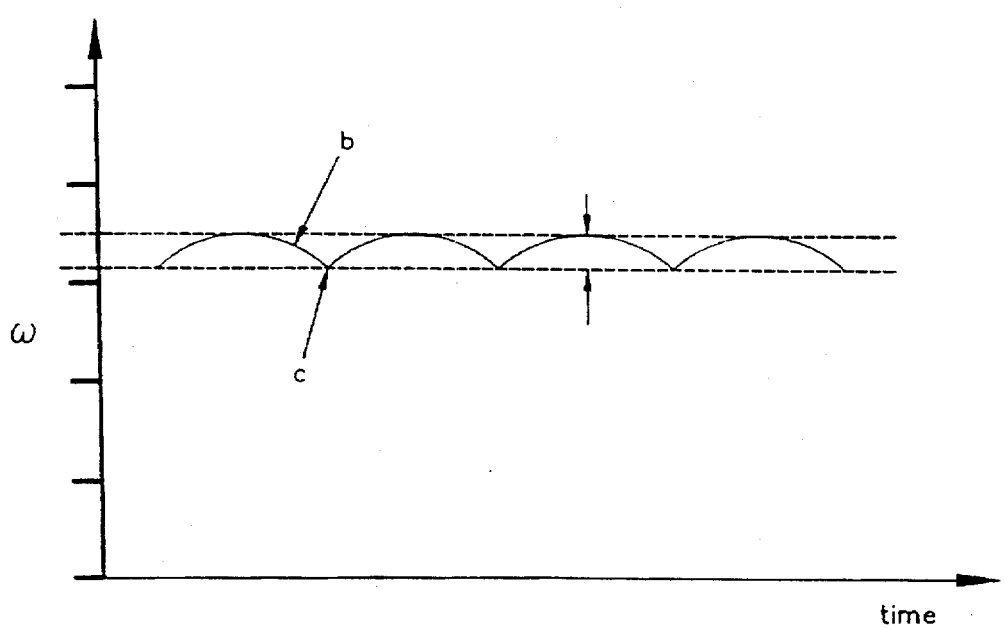
Figure 6:
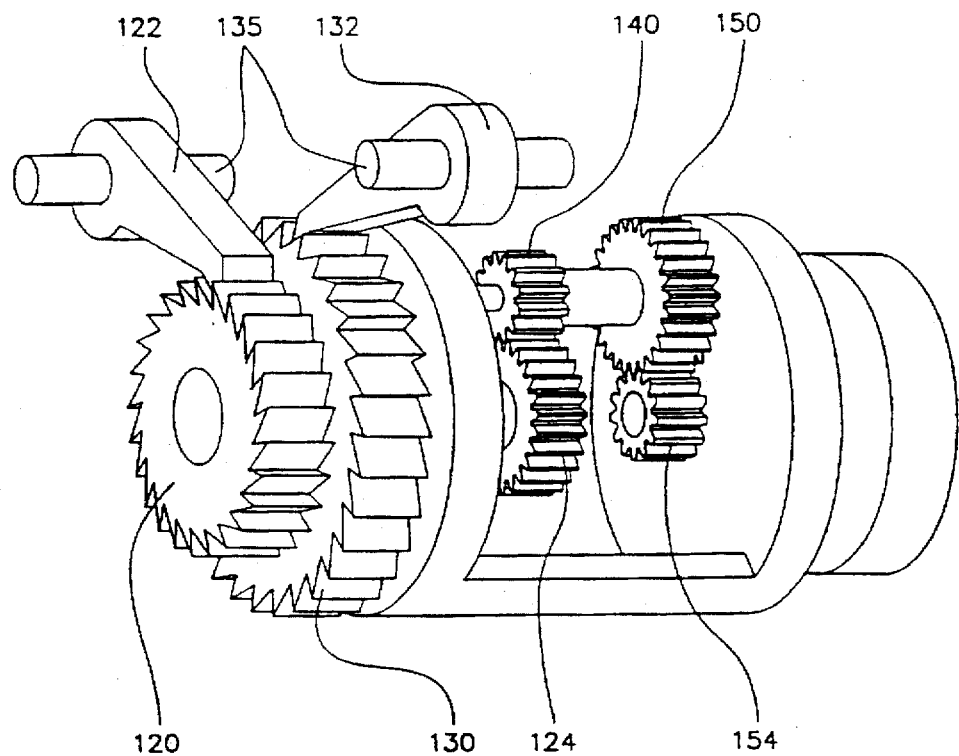
Figure 7:
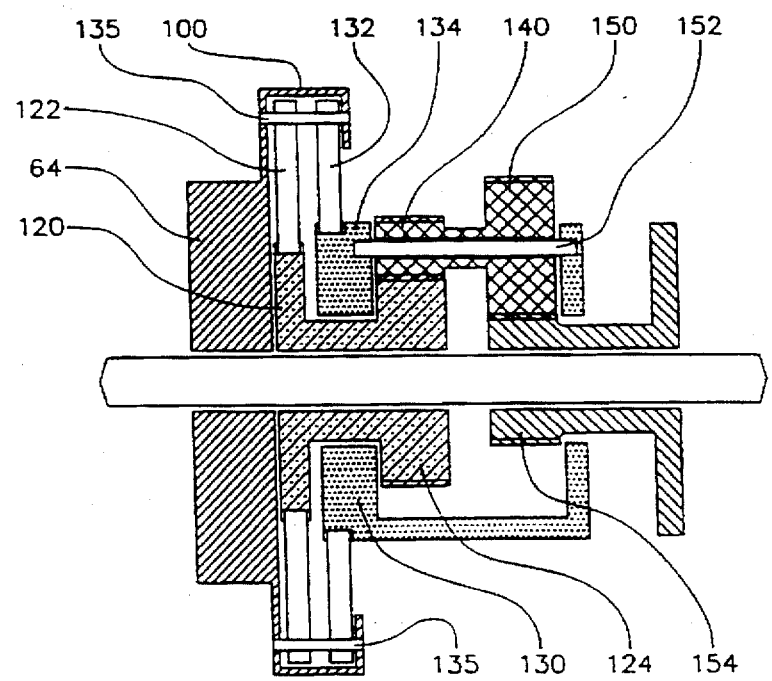
Figure 8:
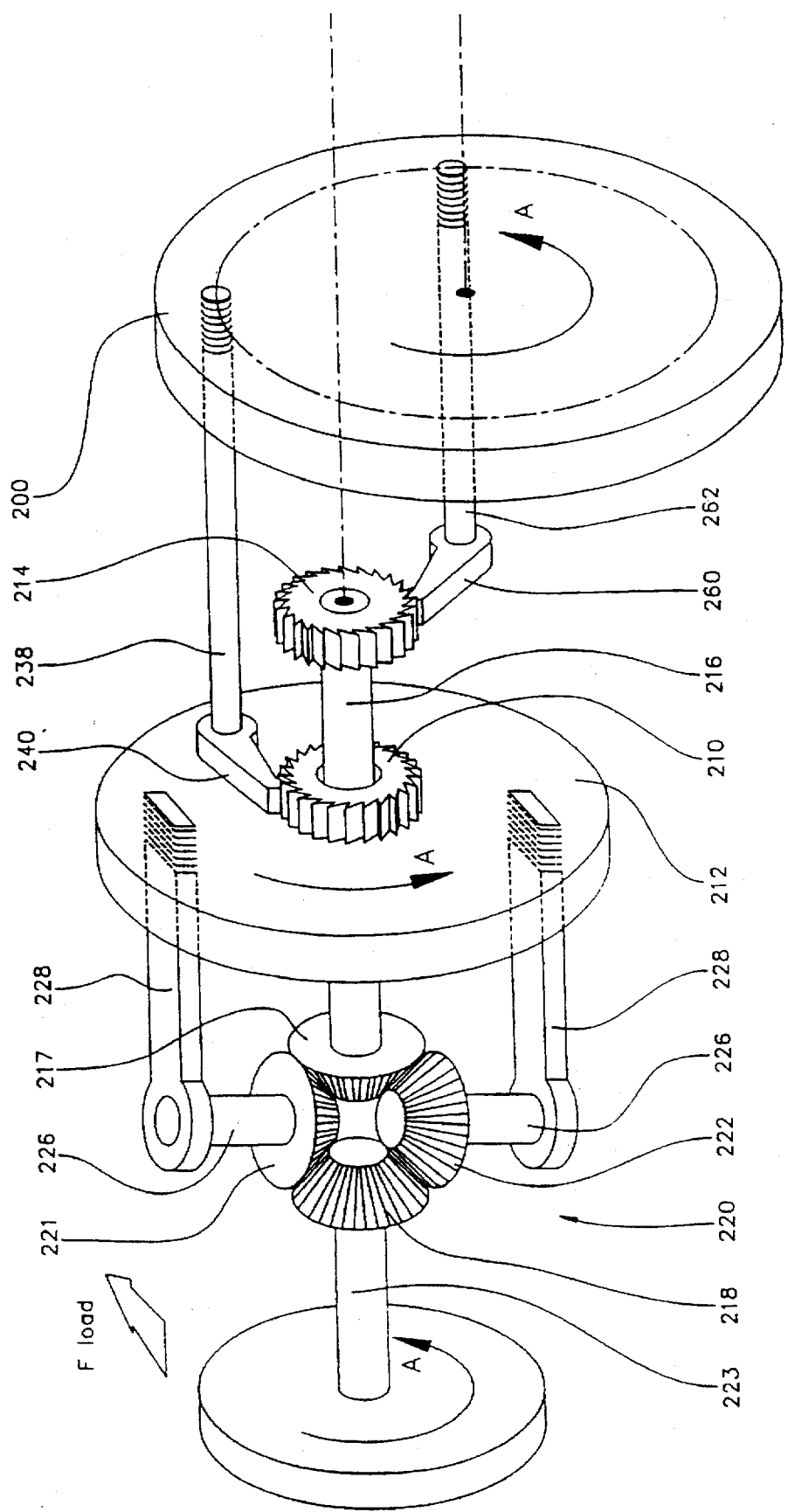
Figure 9:
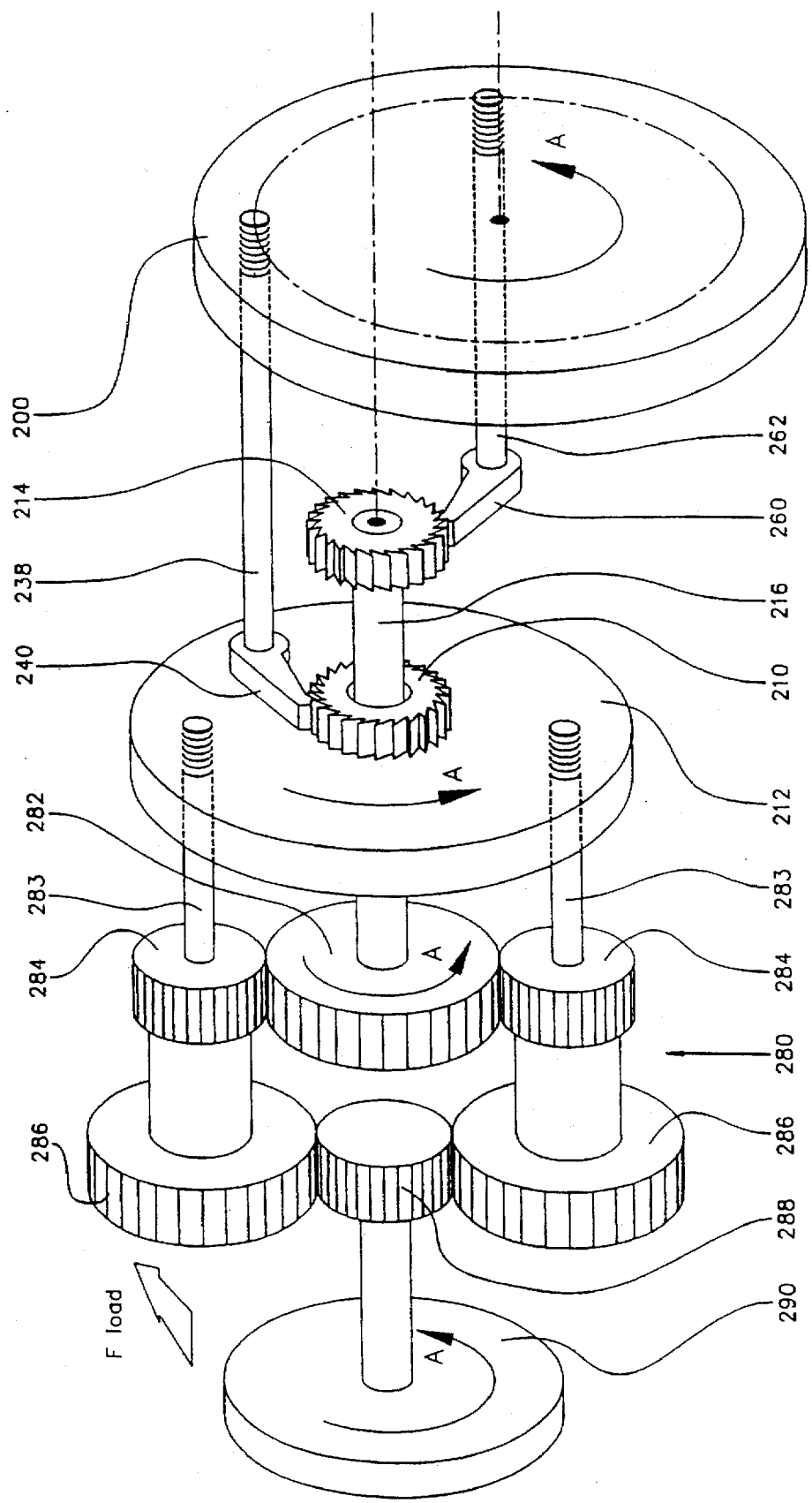
Figure 10:
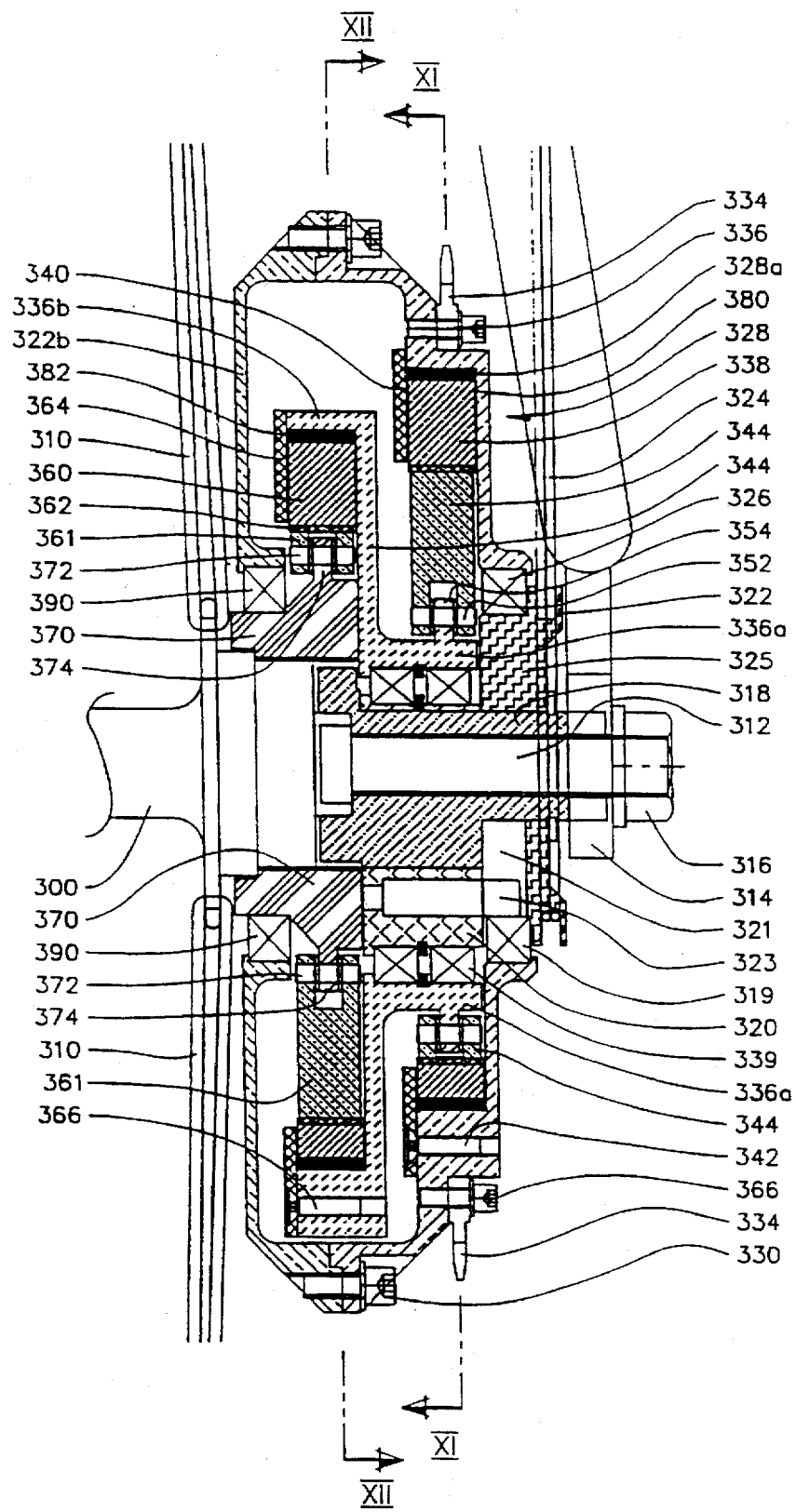
Figure 11:
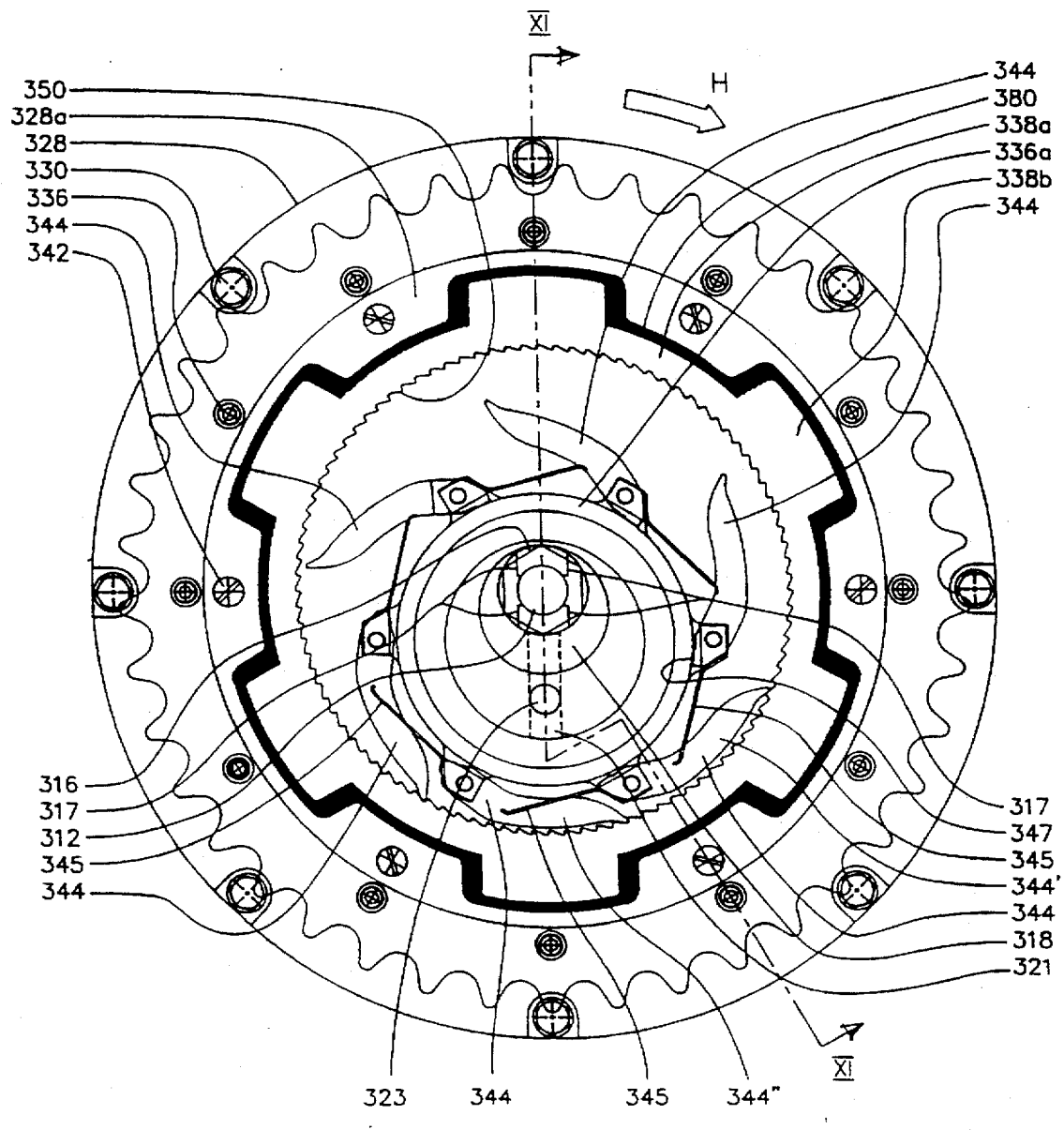
Figure 12:
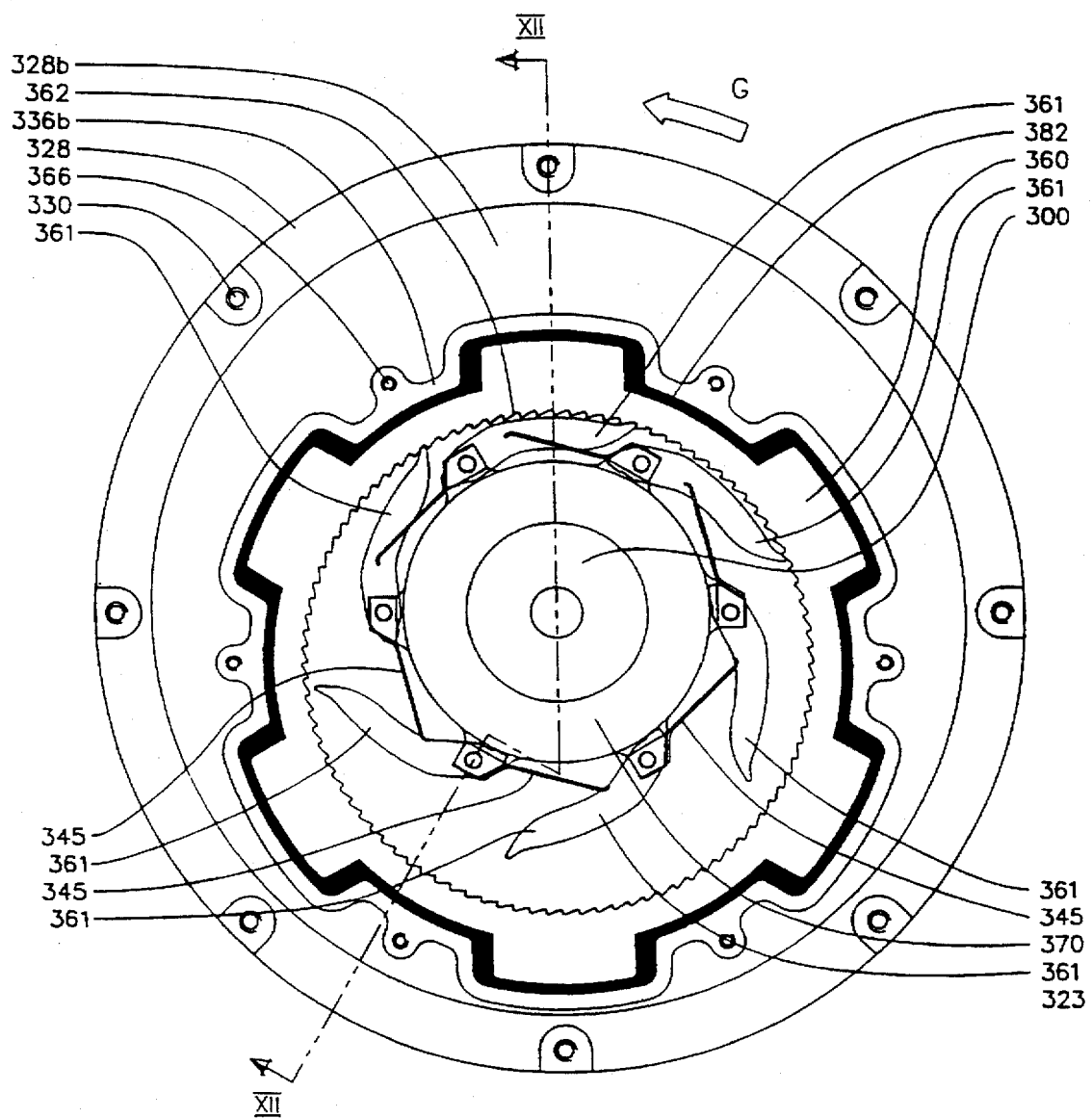
Figure 13:
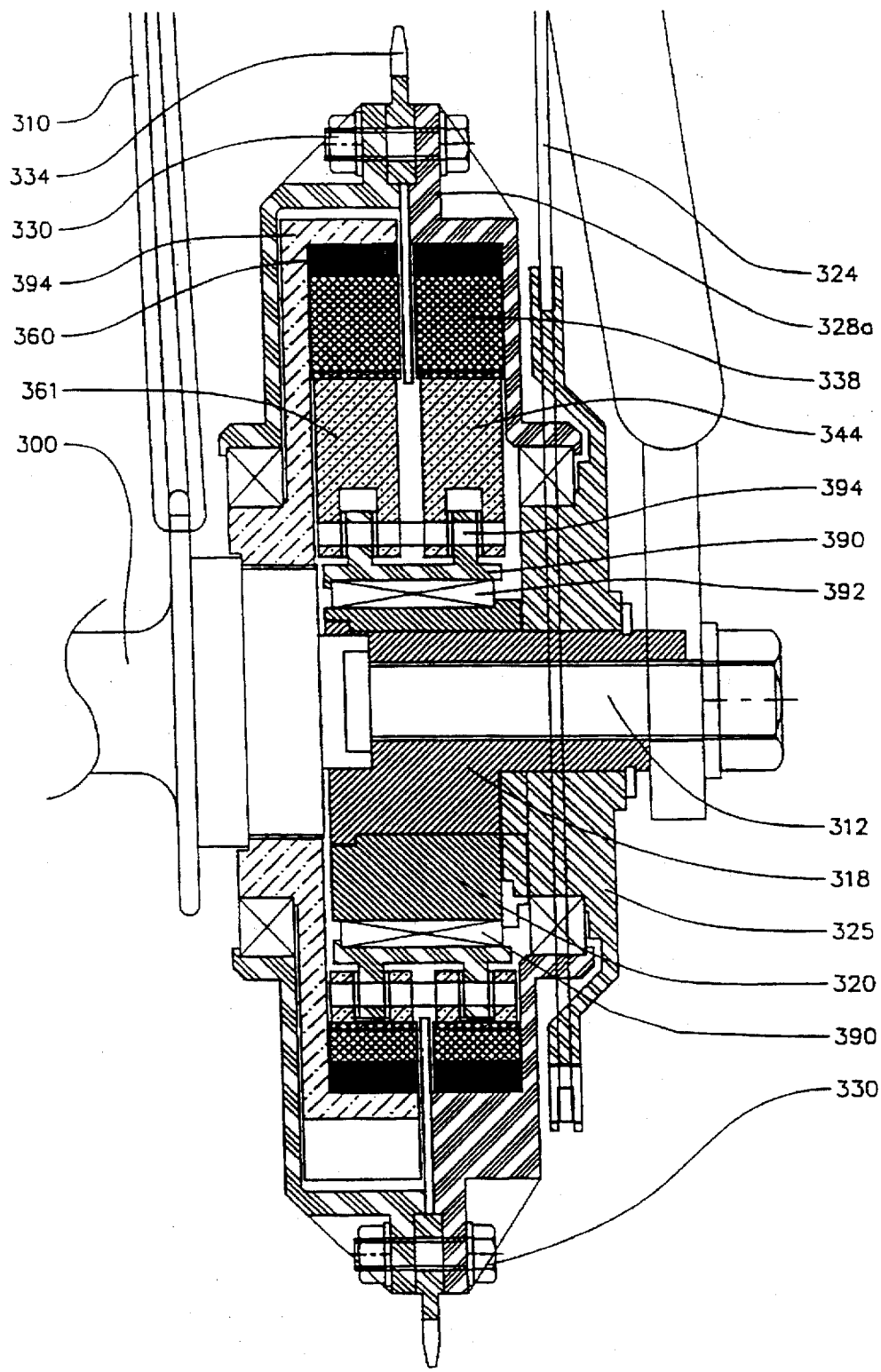
Figure 14:
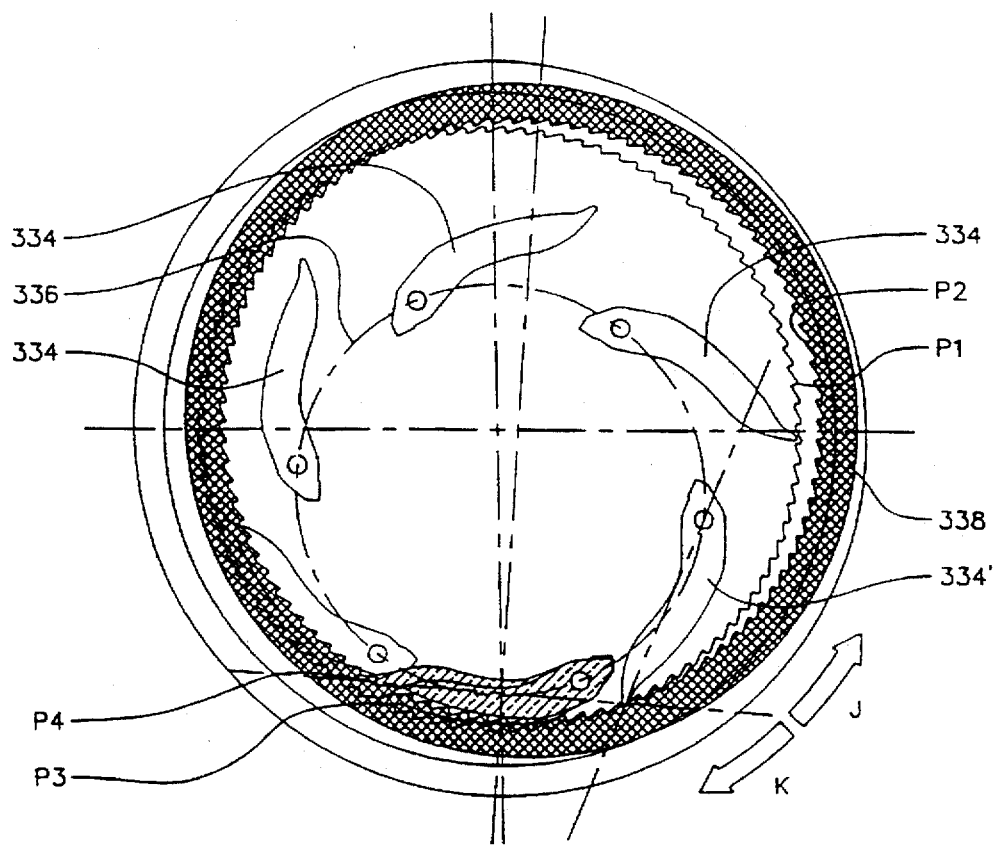
Figure 15:
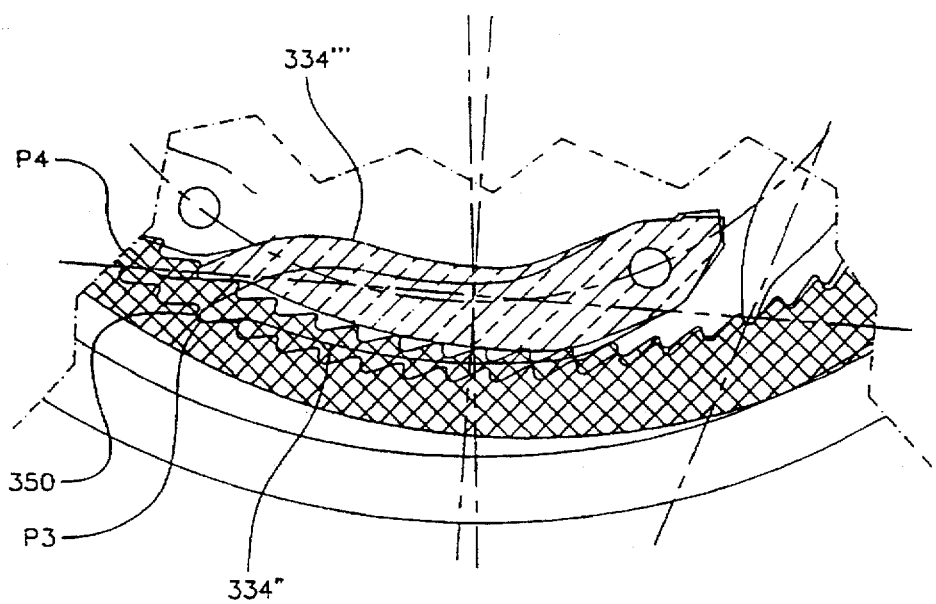
Figure 17:
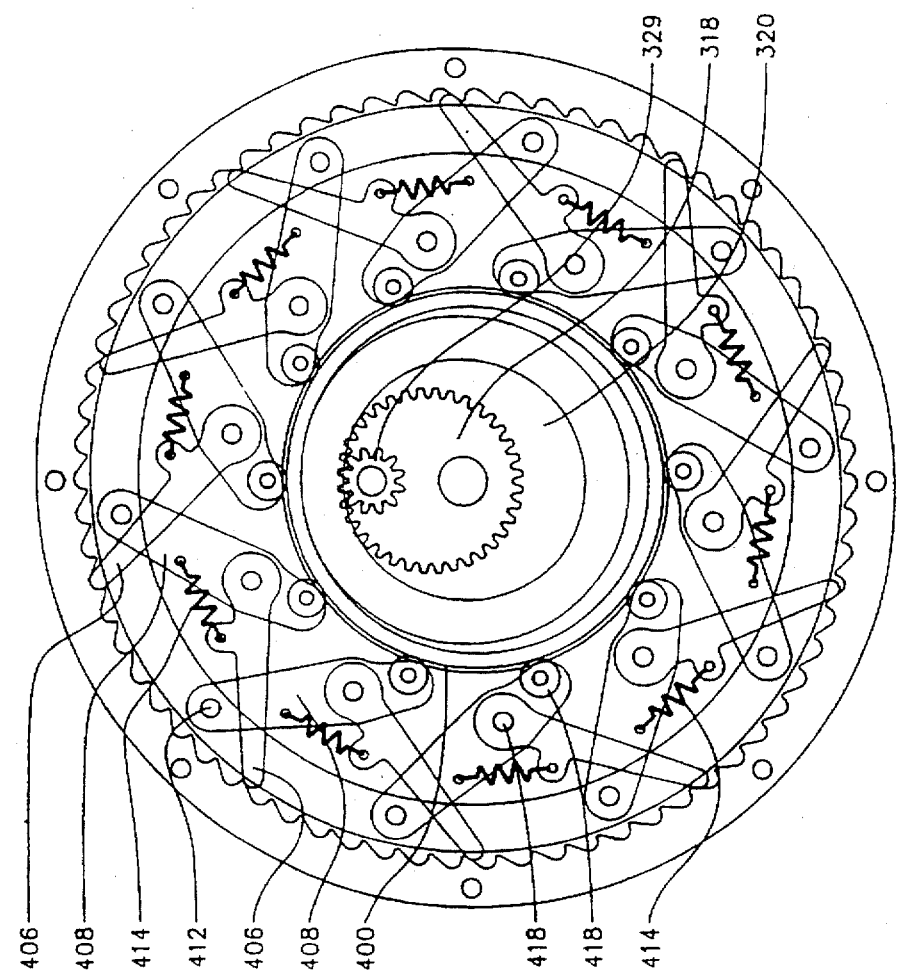
Figure 16:
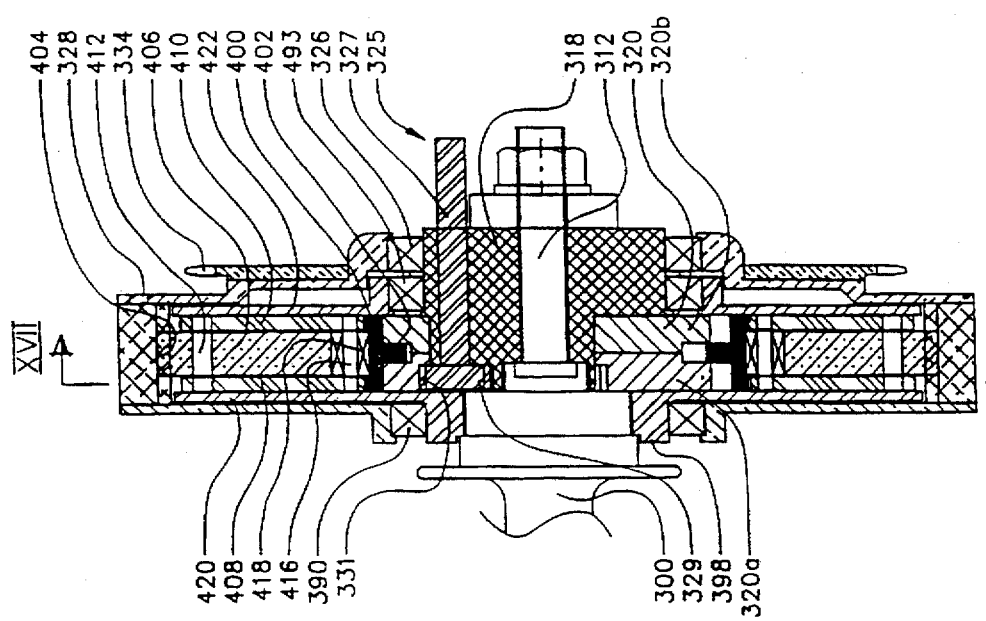
Figure 19:
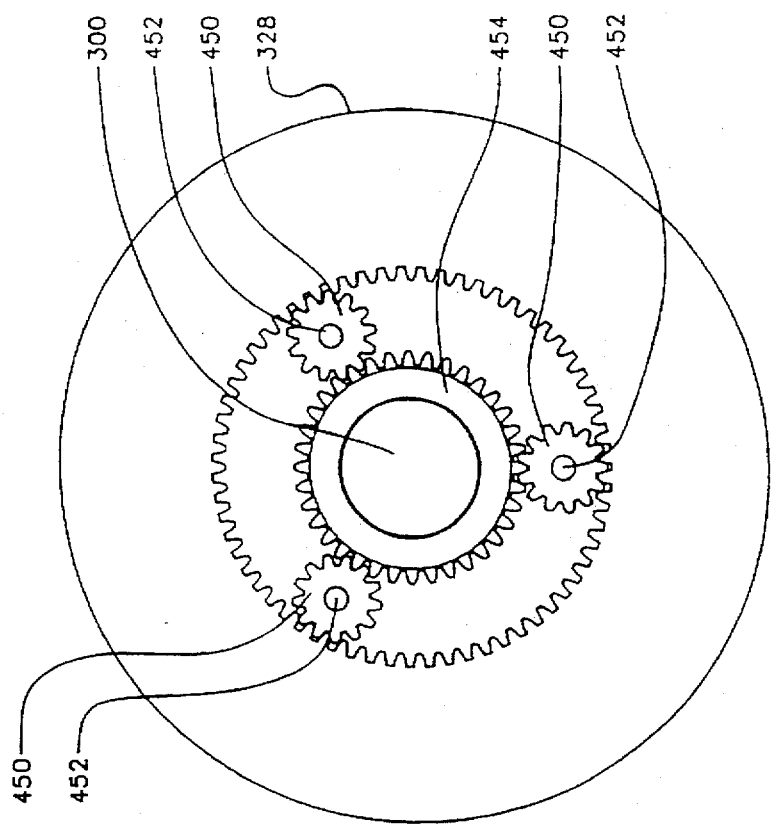
Figure 18:
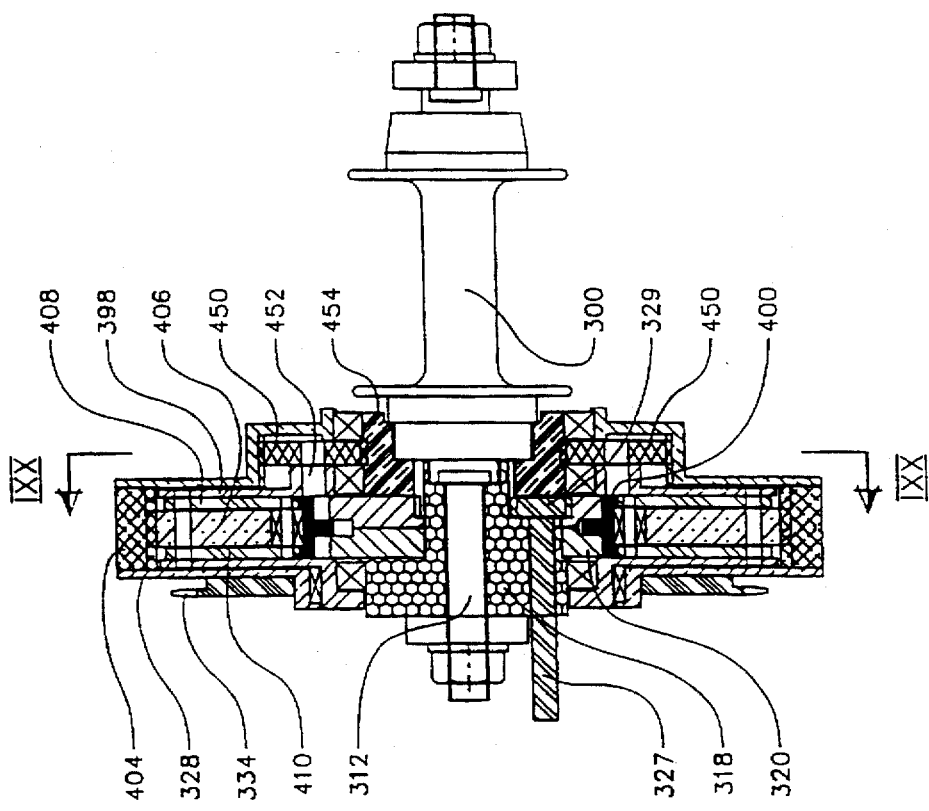
Figure 20:
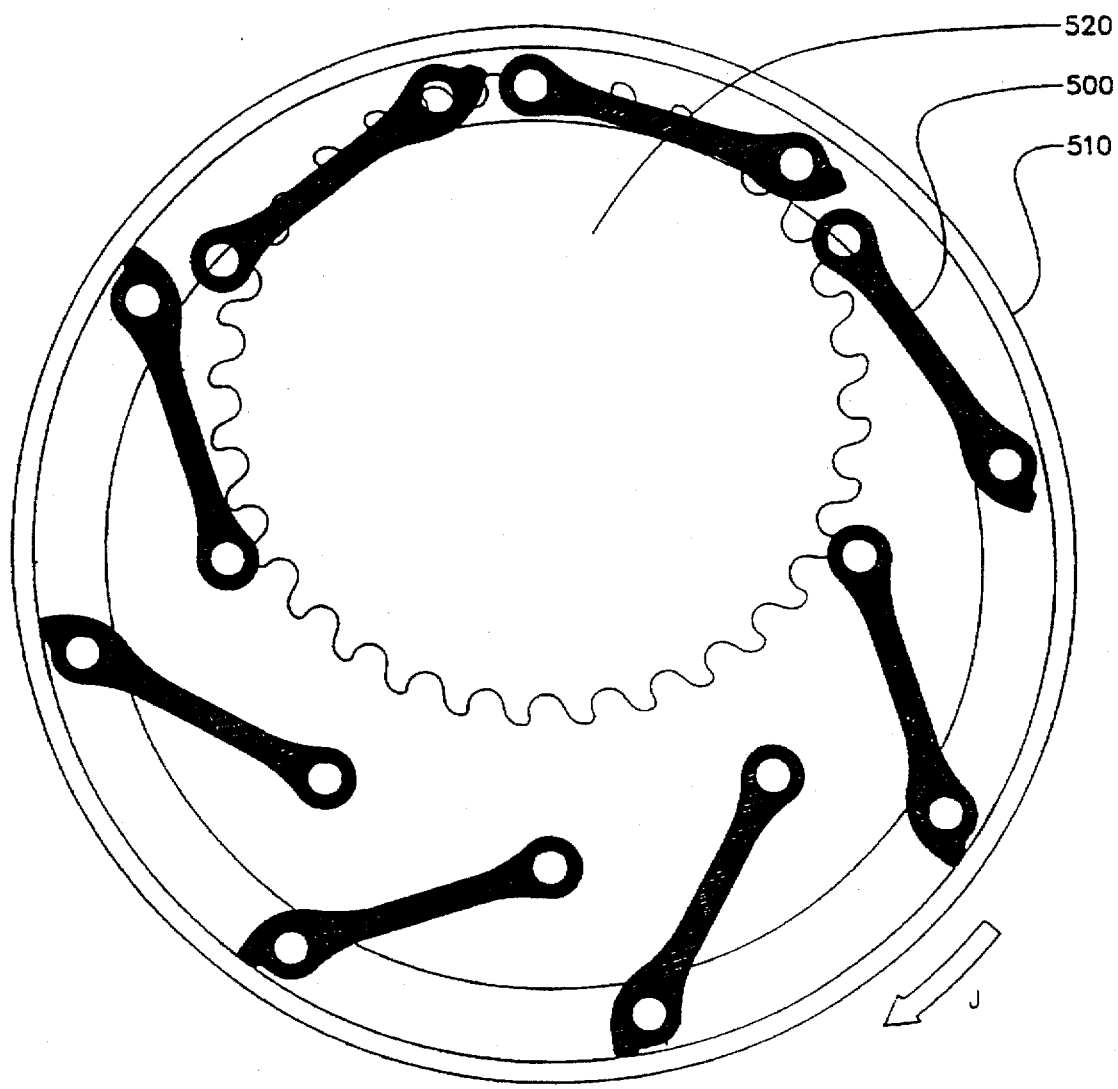
Figure 21:
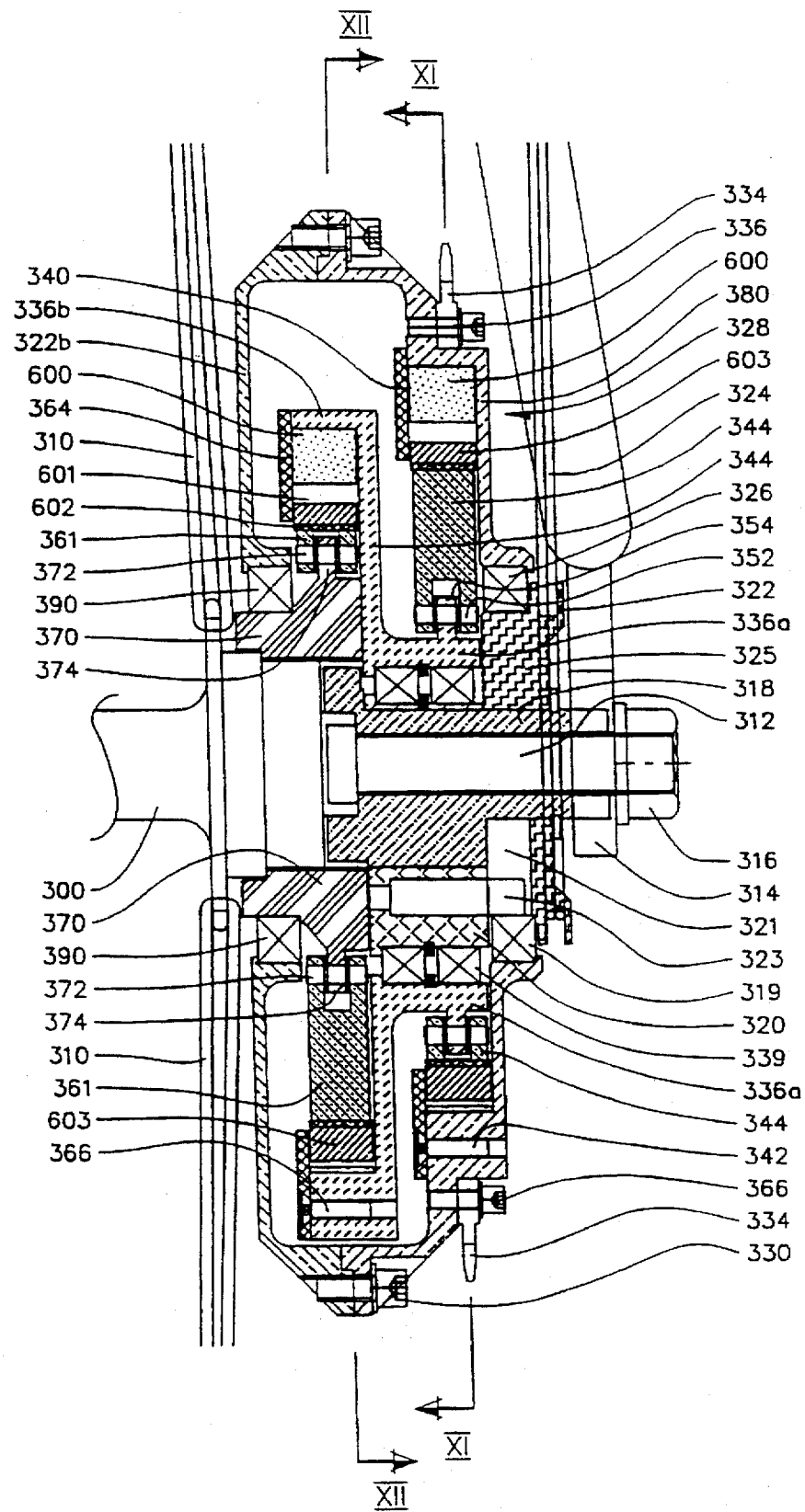
Figure 22:
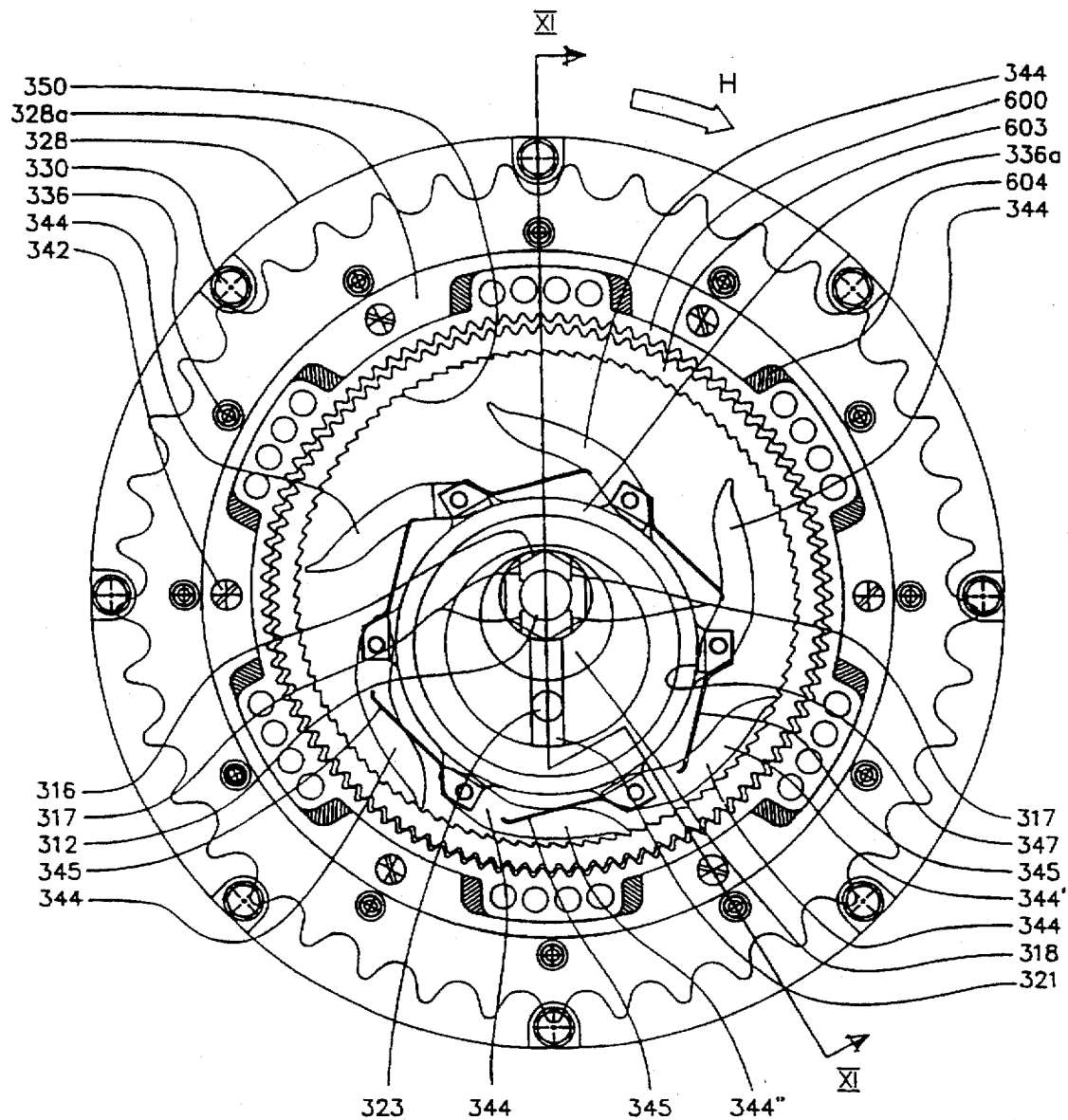
Figure 23:
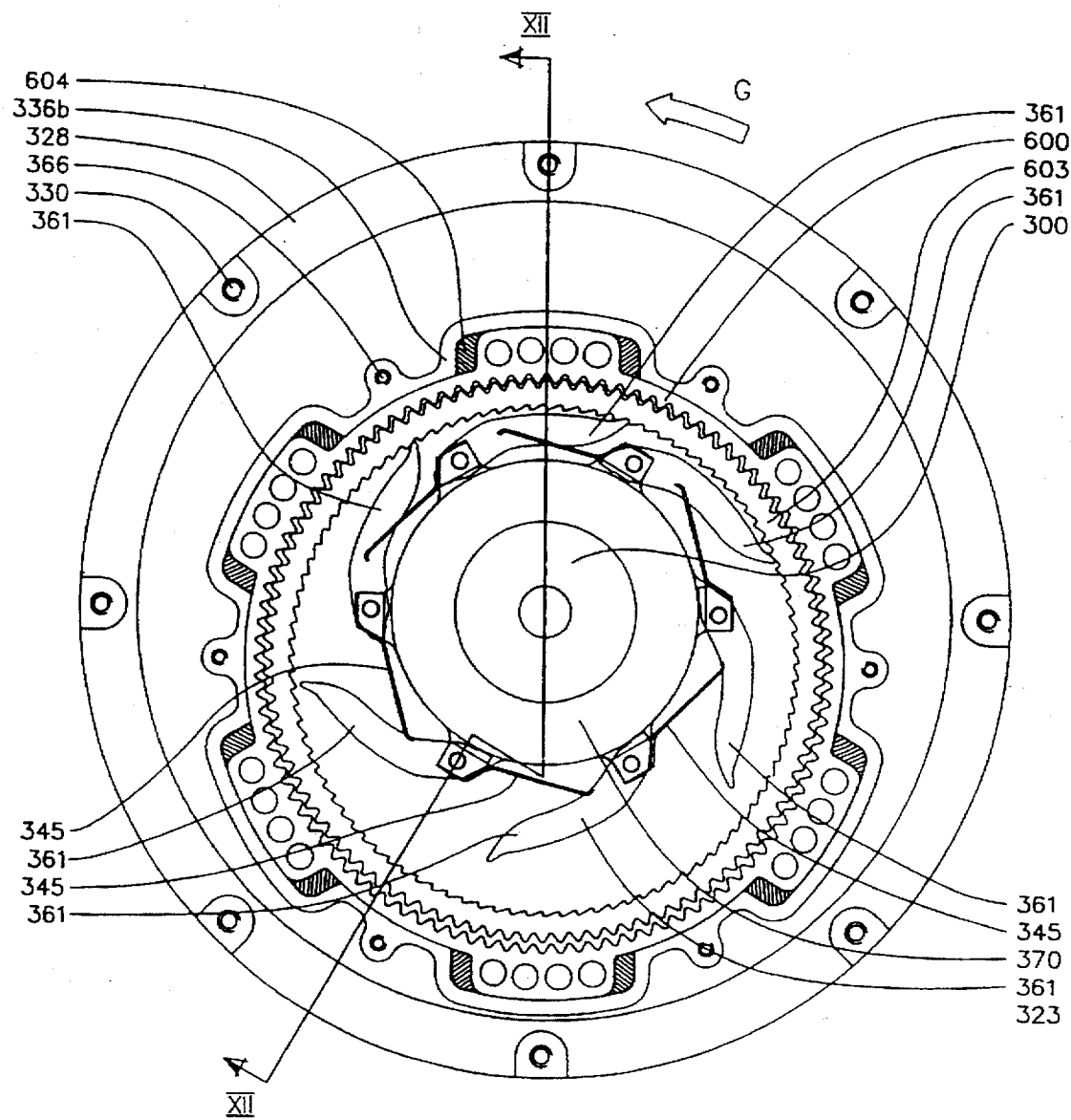

FIG. 5 1 is a graph explaining defects in prior art designs;

FIG. 6 is a perspective view of a third embodiment of the invention;

FIG. 7 is a cross-sectional view of the arrangement shown in FIG. 6;

FIG. 8 is a schematic view of a fourth embodiment;

FIG. 9 is a schematic view of a fifth embodiment;

FIG. 10 is a cross-sectional view through a further embodiment of the invention along the lines XI—XI and XII—XII of FIGS. 11 and 12;

FIG. 11 is a view along the line XI—XI of FIG. 10;

FIG. 12 is a view along the line XII—XII of FIG. 10;

FIG. 13 is a view of yet a further embodiment;

FIG. 14 is a schematic diagram illustrating the principles of differential load distribution;

FIG. 15 is an enlarged view of part of FIG. 14;

FIG. 16 is a cross-sectional view through a further embodiment of the invention;

FIG. 17 is a view along the line XVII—XVII of FIG. 16;

FIG. 18 is a view of a further embodiment of the invention;

FIG. 19 is a view along the line IXX—IXX of FIG. 18;

FIG. 20 is a schematic view of a further embodiment of the invention;

FIG. 21 is a cross-sectional view along the lines XI—XI and XII—XII of FIGS. 22 and 23 respectively of a further embodiment of the invention;

FIG. 22 is a view along the line XI—XI of FIG. 21; and

FIG. 23 is a view along the line XII—XII of FIG. 21.

Figure 2:
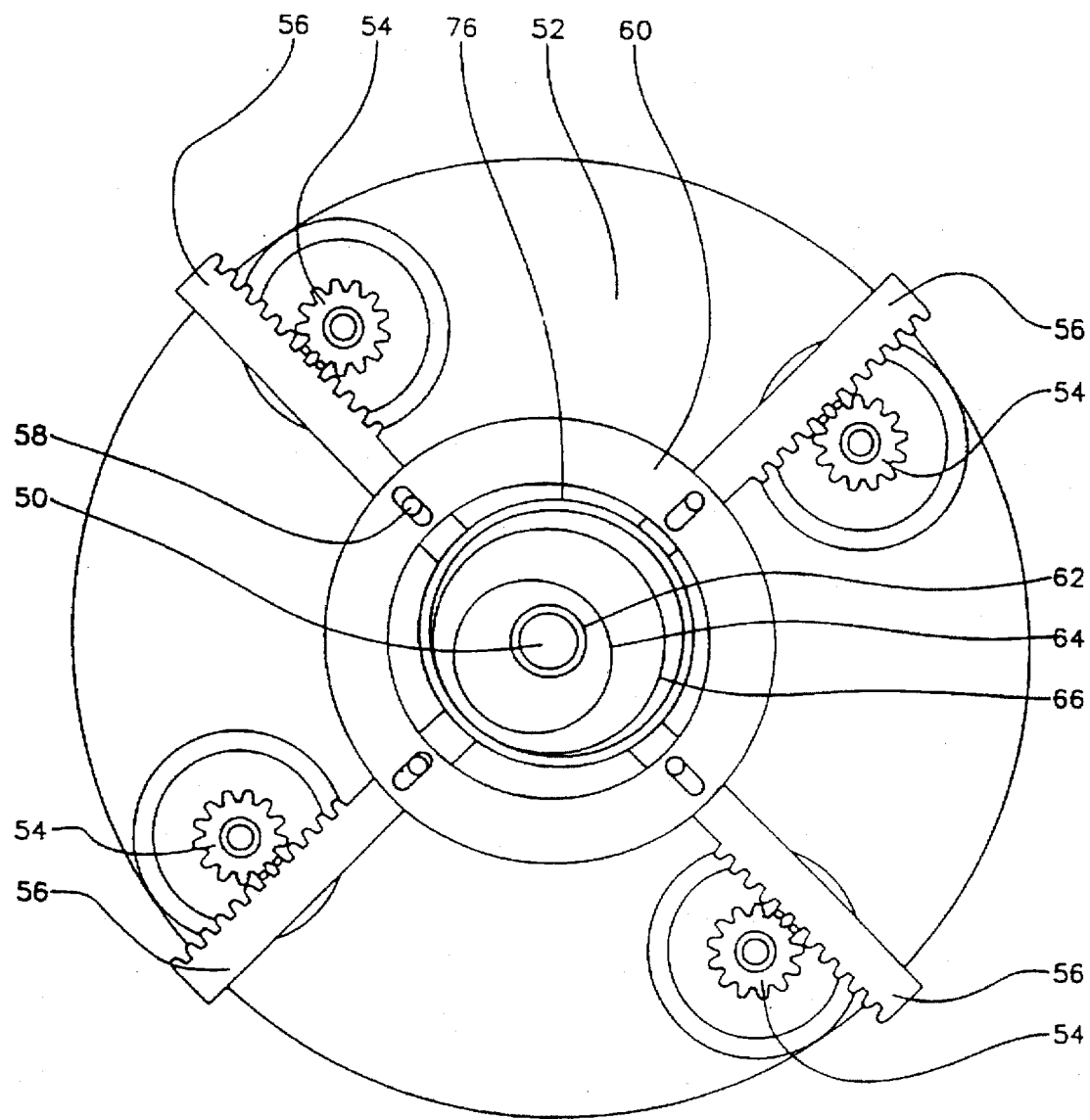
FIG. 2 is a perspective view of the output side of the transmission mechanism of FIG. 1.

With reference to FIGS. 1 and 2, the transmission comprises an input shaft 50 which carries, fast for rotation therewith, a torque web 52. The torque web 52 supports on one side an array of four pinion gears 54 uniformly distributed about the axis of the input shaft 50. Each gear 54 is engaged with a rack 56 which is mounted for reciprocating movement substantially radially of the torque web 52. Somewhat outwardly of its inner end, each rack 56 is mounted by means of a pin 58 in a radially elongate slot in a ring 60 fixed to the torque web 52. The arrangement is such that the inner end portion of each rack passes through the ring 60, with the inner end of each rack 56 lying inwardly of the ring 60 as shown. The racks 56 constitute the secondaries of the transmission and the projecting inner ends of the racks 56 cooperate with the primary, which in this instance is in the form of a stationary double-eccentric arrangement with means for adjusting the eccentricity.

As shown in FIG. 1, the input shaft 50 extends through a sleeve 62 which carries an eccentric 64. A second eccentric 66 is mounted on the eccentric 64 so as to be adjustable angularly relative to the eccentric 64. The eccentric 66 is annular and has mutually eccentric internal and external annular surfaces, the eccentric 66 being held against rotation by means of a pin 68 slidable in radial guide 70 rigid with a fixed structure 72. By turning a control lever 74 rigid with the sleeve 62, the angular relationship of the eccentric 64 relative to the eccentric 66 will be altered, and thus the overall eccentricity of the eccentric 66 relative to the axis of the input shaft 50 will be changed. The relative eccentricities of eccentrics 64 and 66 may be such that the eccentric 66 is adjustable from an eccentricity at one side of the axis of the input shaft 50, through a position at which it is co-axial with the input shaft 50, to an eccentricity at the opposite side of the axis of the input shaft 50. This permits a wide variation in the possible adjustment of the transmission as will be described later.

A ring type motion exchange device 76 is loosely mounted on the eccentric 66 and engages the projecting inner ends of the racks 56. During rotation of the input shaft 50 and thus the torque web 52 relative to the eccentric 66 (which constitutes the primary), the eccentric 66 acts via the compensator ring 76 to effect reciprocating movement of the racks 56 (which constitute the secondaries).

Each pinion gear 54 is linked by a switched clutch means 78 to the shaft 80 of a respective satellite gear 82 located on the opposite side of the torque web 52. The array of satellite gears 82 mesh with a sun gear 84 on an output shaft 86 co-axial with the input shaft 50. The switched clutch means 78 may be of the form described in earlier patent application PCT/AU81/00146 (WO 82/01406) to which reference may be made for a full description. Other forms such as hydraulic switches may also be used. The switched clutch means 78 are actuated by an annular cam 88 formed on the fixed structure 72 concentrically with the input shaft 50, so that as each clutch means 78 is rotated by the torque web 52 around the cam 88, the clutch means 78 is switched on and off at predetermined points of the rotation of the torque web 52, the drive from the pinion gear 54 being applied to its associated satellite gear 82, and thus to the sun gear 84, when the corresponding switched clutch means 78 is switched on. Each clutch mans 78.is switched on for approximately one half of a revolution of the torque web (for example during rotation over an angle of between 160° and 200°) and then switched off for the remainder of the revolution.

In this construction, the ring-type motion exchange device 76 acts to differentially distribute the load progressively between the secondaries (the racks 56).

The co-operation between the cam 88 and the switched clutch means 78 causes the clutch means 78 to be switched on and off at precisely determined points in the cycle, and this occurs irrespective of the direction of rotation. This controlled switching in the construction shown with a rotating torque web permits, when the relative eccentricities of eccentrics 64 and 66 are as described above, an infinitely variable ratio change for a reduction drive (when the effective eccentricity of eccentric 66 is at one side of the axis of shaft 50) through a direct 1:1 drive (when the eccentric 66 is co-axial with the shaft 50) to an overdrive (when the effective eccentricity of eccentric 66 is at the opposite side of the axis of shaft 50). If sufficient eccentricity is supplied in reduction the machine will also function in reverse. The facility for either a reduction drive or an overdrive occurs, because moving the effective eccentricity from one side of the shaft axis to the other results in a change in the angular phase relationship between the eccentric 66 and the annular cam 88 which controls the switching action the controlled switching also permits reactive braking, that is torque to be applied from the output shaft through the transmission to the input shaft in opposition to the input torque as applied for example by an internal combustion engine; the controlled switching also permits the transmission to act in either direction of rotation.

In the embodiment described with reference to FIG. 1 and in the other embodiments described hereinafter, the secondary members which in the embodiment previously described comprise the racks 56 and gears 54, are driven for only part of each revolution of the transmission mechanism when the gear ratio is other than 1:1. If the eccentricities are adjusted to provide a gear ratio of 1:1 in which the eccentricity effectively disappears and is concentric with the input supply shaft 50, the racks 54 and gears 56 are driven throughout the entire rotary movement of the transmission. It is only when the eccentricity adjusts the gear ratio to be other than a 1:1 output that the secondary members are driven to transmit power through only part of each rotary cycle of the input shaft 50.

Although in the preferred embodiments of the invention, the eccentricities provide for a infinitely variable ratio between a maximum and a minimum, it would be possible to fix the eccentricities in a particular position so that only one particular ratio, for example, 1:1.3 is provided by the transmission mechanism.

It is to be noted that instead of having precisely controlled switches, one-way ratchet and pawl type couplings could be interposed between the pinion gears 54 and their associated satellite gears 82 in a manner similar to that illustrated in FIG. 1. In this case, the transmission would only be able to operate in direct 1:1 drive and overdrive, in a single direction of rotation and without permitting reacting braking; however for some applications a direct drive and overdrive may be the only functions required.

The output motion assembler in the construction shown in FIGS. 1 and 2, namely, the satellite and sun gear arrangement permits the overall position of the variable ratio range to be readily changed simply by altering the gear ratio between the satellite gears and the sun gear, without changing other components of the transmission. Similar changes can be made by changing the diameter of the pinion gears engaged with the racks.

In the construction described, the input and output shafts 50 and 86 remain concentric as the ratio is varied. This contrasts with certain previously proposed motion transformation mechanisms in which it is necessary to shift one or other of the shafts laterally to effect ratio change and which, in turn, leads to difficulties in properly supporting the shafts and in inputting and outputting the load within a transmission line. As will be apparent, with the mechanism described in which the shafts are always concentric, effective bearing support can easily be provided, and there are no difficulties in incorporating the mechanism within a transmission line.

Figure 3A:
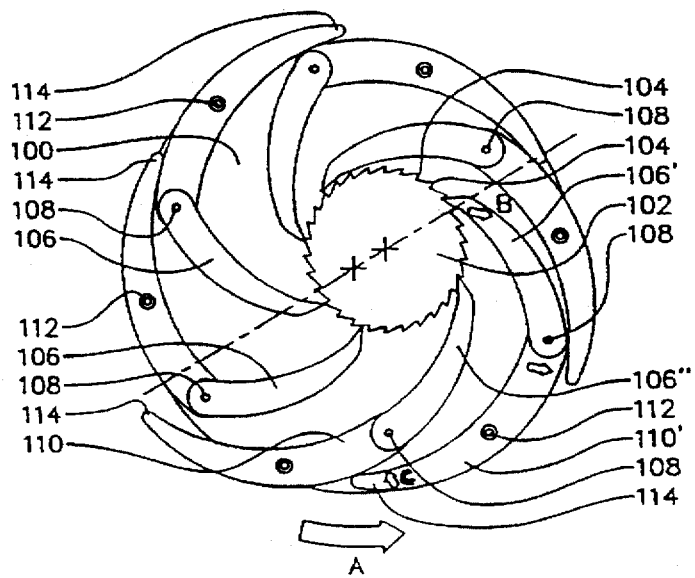
FIG. 3A, FIG. 3B and FIG. 3C are views of a second arrangement according to a further embodiment of the invention.
Figure 3B:
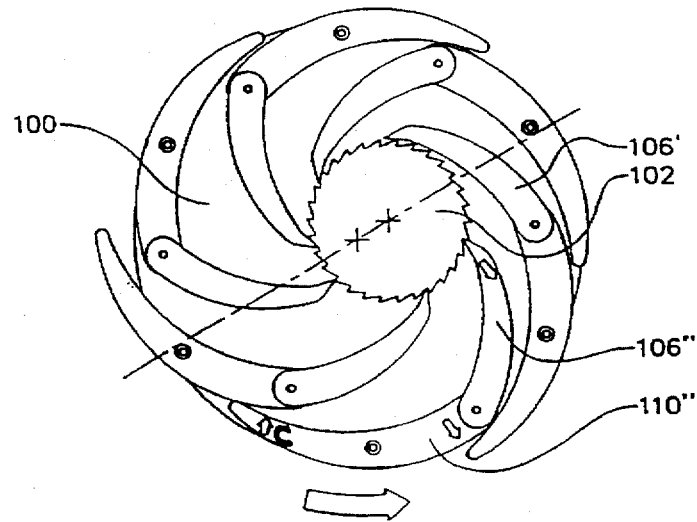
Figure 3C:
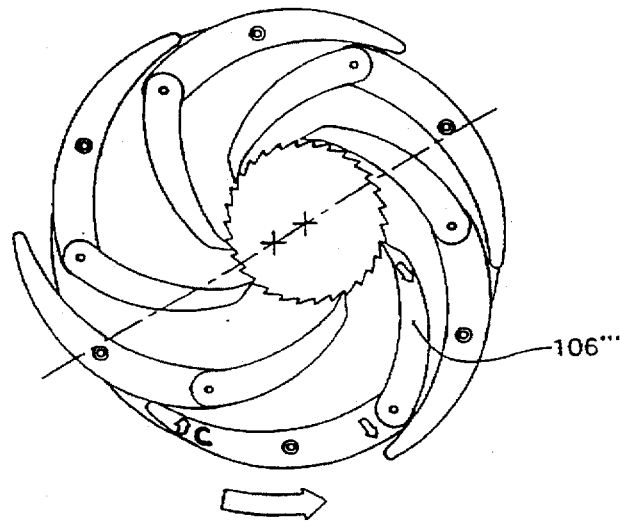

With reference to FIGS. 3A to 3C which show a further arrangement in schematic form, a variator 100 is arranged on a variable eccentric (not shown) of the type described with reference to the embodiment of FIGS. 1 and 2, so that the variator 100 can be rotated in the direction of arrow A with the variable eccentric. As in the earlier embodiment the variable eccentric provides the variable gear ratio and the ratio can be changed in the same manner as described with reference to the earlier embodiment. An assembler 102 such as a ratchet rear as shown in the drawings which is able to accept partial circular motions and assemble them sequentially in a second rotary form, is arranged eccentrically with respect to the variator 100 and is in the form of a circular toothed rack having a plurality of teeth 104. A plurality of secondary members in the form of pawls 106 are pivotally mounted on the variator 100 for rotation with the variator 100. Each pawl 106 has a lever 110 pivotally coupled to it by a pivot pin 108. Each lever 110 is also pivotally mounted by a pivot 112 intermediate the pivot 108 and a free end 114 of the lever 112.

As the variator 100 rotates the lever 106' is brought into engagement with a tooth 104 on the assembler B through a driving zone in view of the eccentric mounting of the assembler 102 with respect to the variator 100. The driving zone is approximately an amount of 360+n° where n is the number of pawls 106. When the pawl 106' engages with the assembler 102 load is applied to the pawl 106' and that load is transmitted by the pawl 106' to the lever 112 in view of the pivotal connection between the pawl 106' and the lever 112. The load is represented by the arrow B shown in FIG. 3A. The load applied to the pawl 106' will cause the lever 110' to pivot about pivot 112 in the direction of arrow C so that the free end 114 drives the lever 106" into engagement with the assembler 102 so that load is also applied to the pawl 106" so that the load is shared between the pawls 106' and 106". Continued rotation of the variator 100 will therefore cause the pawls 106' and 106" to drive the assembler 102 to provide output power.

As is shown by FIG. 3B as the variator 100 rotates so that the pawl 106' moves out of engagement with the assembler 102 the load applied to the pawl 106" will cause the pawl 106'" to engage the assembler 102 by virtue of the lever 110" so that the load is shared between the pawls 106" and 106'". Continued rotation of the variator 100 as is shown in FIG. 3C will then bring the next pawl 106"" into engagement with the assembler 102 so that the load is shared between the pawls 106'" and 106"".

Figure 4:
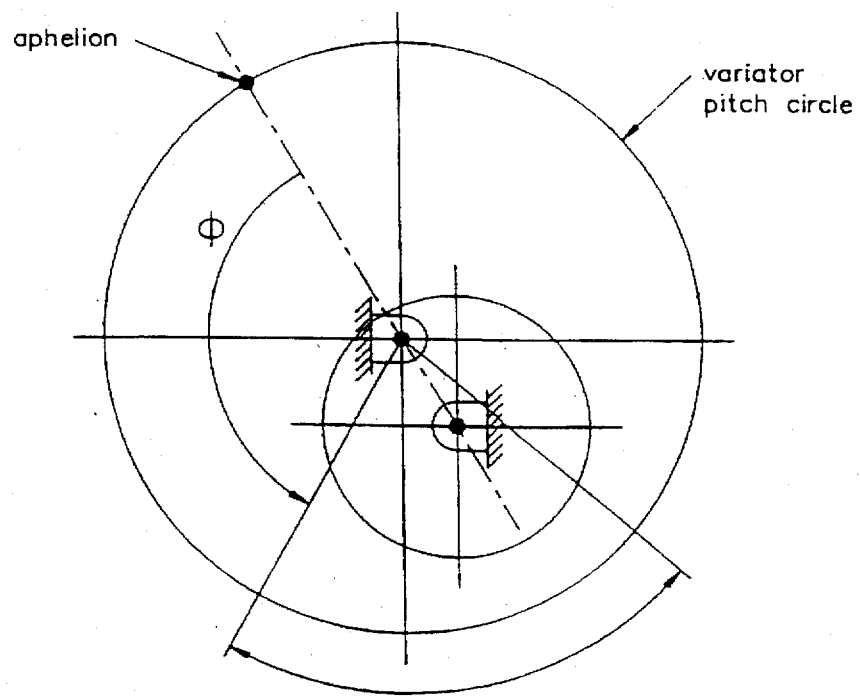
FIG. 4 is a diagram to assist in explaining the operation of the embodiment of FIGS. 3A to 3C.

Thus, once again the load is always differentially distributed between two pawls 106 so that a smooth output power supply is obtained as is shown with reference to FIG. 4 as the variator 100 rotates each pawl 106 will enter the driving zone. This occurs at any angle $\phi$ from the aphelion for any given eccentricity of the variator 100 and assembler 102. Within the driving zone, the instantaneous angular velocity varies over an appreciable range. If the load distribution means provided by the levers 110 in FIGS. 3A to 3C (or for that matter the ring 76 in FIGS. 1 and 2) is not provided as the driving force transfers from a pawl just leaving the driving zone to its subsequent pawl, there is a sudden change in the angular velocity. The cycle of variation is then repeated as the new pawl traverses the driving zone, and continues to repeat itself for each of the pawls in succession. The speed ratio characteristic is illustrated in FIG. 5 and it is to be noted that the output is not smooth having bumps b and cusps c. The transmission characteristics of the device without the load compensation mechanism is therefore found to be inherently bumpy (i.e. speed ratio fluctuating over a range in a cyclic fashion), with n "bumps" per revolution of the variator where n corresponds to the number of pawls, and spiky (i.e. possessing discontinuous cusps in the time variation in the angular velocity which corresponds to infinite acceleration spikes). The motion distribution and consequent load distribution means of the preferred embodiment of the present invention overcomes these undesirable characteristics and provides a smoother output characteristic. With the arrangement shown in FIGS. 1 and 2 the cusps of FIG. 5 cannot occur since at least two pawls (in the case of the embodiment of FIGS. 3A to 3C) are always in contact with the assembler 102 and each succeeding pawl is successively loaded and brought into contact by the actions of the levers 110 before it enters the driving zone. The differential loading of each successive pawl is always carried out with two pawls driving. This operation automatically prevents any one pawl contributing to the rotation on its own. Hence there can be no bumps as illustrated in FIG. 5 when the transmission becomes continuous and flat.

FIGS. 6 and 7 show a further embodiment of the invention.

This embodiment of the invention utilises a double gang arrangement in which two assemblers 120 and 130 are provided. For ease of illustration in FIG. 6 the variator 100 and the variable eccentric 64 are not shown. Each of the assemblers 120 and 130 is provided with a plurality of pawls 122 and 132 (only one being shown in FIG. 6) which are arranged in the same manner as shown in FIG. 3A to FIG. 3C. In this embodiment the pawls 122 and 132 are mounted to variator 100 by pivot pins 135. Thus, each of the assemblers 120 and 130 is provided with a plurality of pawls 122 and 132. The assembler 120 is coupled to a planetary gear 124 and the assembler 130 is coupled to or formed integral with a planetary mechanism 134. The planetary gear 124 engages with a gear 140 which is formed integral with a gear 150. The gears 140 and 150 are mounted on a shaft 152 which is supported in the planetary mechanism 134. The gear 150 engages with an output gear 154.

If the output gear 154 is under load then if assembler 120 is forced to rotate, the assembler 130 will rotate in the opposite direction and vice versa. If the assemblers 120 and 130 are engaged by respective pawls 122 and 132 in the driving zone, then if the pawl 122 operating on assembler 120 will load assembler 120 the planetary gear mechanism 130, 134, 124 and 150 will attempt to rotate assembler 130 and cause pawl 132 to be loaded. This means that there will always be at least two pawls in the system bearing the load although the pawls will belong to different assemblers 120 and 130.

In this embodiment of the invention each of the assemblers 120 and 130 operates in such a way as to keep the pawls 122, 132 in the driving zone in the opposite gang loaded as they pass out of the driving zone rather than loading pawls on the entry side of the driving zone. The result is nevertheless the same and the double gang system shown in FIGS. 6 and 7 has the additional advantage of being able to use the planet to achieve a much wider overall transmission ratio range than can be achieved by the previously described mechanism.

The embodiment of FIGS. 6 and 7 by virtue of the gear arrangement and the double gang system produces a differential loading which involves a differential motion exchange between the two gangs formed by the assemblers 120 and 130 and their respective pawls 122 and 132.

FIGS. 8 and 9 show two further embodiments which are similar to the embodiments shown in FIGS. 6 and 7.

With reference to FIG. 8, variator 200 to which input power is supplied is eccentrically arranged with respect to a first assembler 210 which is fixed to plate 212. A second assembler 214 is mounted on shaft 216 and the shaft 216 passes through the assembler 210 and plate 212 and carries a bevel gear 217. The bevel gear 217 forms part of a bevel planet arrangement forming a differential 220 composed of the bevel gear 217, bevel gear 218 and bevel gears 220 and 222. The gear 218 has an output shaft 223 for providing output power. The gears 221 and 222 are mounted on shafts 226. The shafts 226 are connected to rods 228 which in turn are connected to the plate 212. The shafts 226 are able to rotate in the rods 228 by being mounted in suitable bearings or journals (not shown).

The assembler 210 has a plurality of pawls 240 for engagement therewith (only one shown in the drawing). The pawls 240 are pivotally mounted on pivot pins or rods 238 which in turn are connected to the variator 200. The second motion assembler 214 also has a plurality of pawls 260 arranged for engagement with it. The pawls 260 are mounted on pivot pins or rods 262 which are also connected to the variator 200.

The assemblers 214 and 210 are arranged eccentrically with respect to the variator 200 in the same manner as described with reference to the earlier embodiments. Thus, rotation of the variator 200 in the direction of arrow A will cause the pawls 240 in turn to engage with the assembler 210 and drive the assembler 210 for part of the revolution of the variator 200. Engagement of the pawls 240 with the assembler 210 will tend to cause the plate 212 to rotate in the direction of arrow A. Since the output shaft 223 is loaded, rotation of the plate 212 will tend to cause the entire differential bevel gear arrangement 220 to rotate in the direction of arrow A by virtue of the engagement of the rods 228 with gears 221 and 222 via shafts 226. This in turn will cause the bevel gear 217 to rotate in the direction of arrow A so that the motion assembler 214 is forced into engagement with one of its pawls 260 to load that pawl. Thus, differential loading of the pawls 240 and 260 occurs by virtue of a differential motion exchange between the two assemblers 214 and 210 so that the load is always shared between at least two of the pawls 240 and 260. The assembler 214 rotates in the same direction as the assembler 210 and the variator 200 to which the pawls 260 are coupled also rotates in that direction (ie direction of arrow A). The pawl 260 is loaded because the assembler 214 is rotating faster than the variator 200. Thus, the slowest of the pawls 260 engages with the assembler 214 so that pawl is loaded.

The distribution of the load between the pawls 240 and 260 and the differential motion exchange between the two assemblers 210 and 214 provides smoother output power at the shaft 223 without the bumps and cusps shown in FIG. 5.

FIG. 9 shows an embodiment which is similar to FIG. 8 and the same reference numbers have been used in this embodiment as used in FIG. 8 to identify the same parts as in FIG. 8. The difference between the embodiments of FIGS. 8 and 9 is that the differential bevel arrangement 220 has been replaced by a cylindrical planet gear arrangement 280 and the assemblers 210 and 214 rotate in opposite directions.

In the embodiment of FIG. 9 rotation of the variator 200 in the direction of arrow A will cause pawl 260 to drive assembler 214 which will in turn drive shaft 216 and sun gear 282 of the gear arrangement 280. Once again if load is applied to the output shaft 290, planetary gears 284 and planetary gears 286 which are fixed relative to them will rotate in unison about sun gear 282 tending to rotate plate 200 by virtue of the connection of the variator 212 with the sun gears 284 by shafts 283. Thus, the plate 212 will rotate in the direction of arrow A thereby rotating assembler 210 in the same direction so that the pawl 240 is loaded. Thus, the assembler 210 rotates in the opposite direction to the assemble 214 and at least one of the pawls 240 and at least one of the pawls 260 is loaded at any one time. Loading of the pawl 240 therefore distributes the load between the pawls 240 and 260 and also causes a differential motion exchange between the assemblers 212 and 214.

The advantage of the cylindrical planet gear arrangement 280 in FIG. 9 is that the gear ratio can be easily changed by simply altering the ratio between the gears in the gear system 280. The differential gear arrangement 220 in FIG. 9 produces a fixed 2:1 gear ratio.

With reference to FIGS. 10, 11 and 12, a hub 300 of a bicycle wheel which may include spokes 310 is shown, with the transmission mechanism of this embodiment mounted on it. The hub 300 is mounted on a shaft 312 which is fixed to a frame 314 of the bicycle by a nut 316. As is best shown in FIG. 11, the shaft has flats 317 which key into an appropriate slot on the frame 314 to fix the shaft with respect to the frame so that the hub 300 is able to rotate about the fixed shaft 314. An inner eccentric 318 is arranged on the shaft 312 and is also fixed to the frame 314. Mounted on the fixed inner eccentric is a movable outer eccentric 320. A gear ratio changer 325 is coupled to the outer eccentric 320 and is provided with a pulley 322 which receives a cable 324 for rotating the outer eccentric 320 on the inner eccentric 312 in order to change the ratio of the transmission mechanism as will be described in more detail hereinafter. The gear changer 325 is mounted on bearings 326 so that the gear changer 325 can rotate relative to an outer casing 328 which comprises two casing portions 328a and 328b secured together by bolts 330. The outer eccentric 320 is provided with a pin 323 which is received within a slot 321 in gear changer 325. A pawl carrier 336 is arranged within the casing 328 and in the cross-sectional view shown in FIG. 10 is generally of Z-shaped cross-section. The carrier 336 is mounted on bearings 338.

The outer casing 328a is provided with a sprocket 334 which is secured in place by bolts 336'.

A gear ring 338 is arranged within the casing 328 and is secured in place by an annular plate 340 which in turn is secured in place by bolts 342. The gear ring is provided with teeth 350 on its inner circumference and the outer circumference of the gear ring is provided with recesses 338a and projections 338b so that the outer circumference is stepped as is best shown in FIG. 11.

Pawl carrier 336 carries a first series of pawls 344 which are mounted to base portion 336a by a pivot pin 352 which passes through the pawls 344 and through a lug 354 projecting from the base 336a of the carrier 336.

The pawl carrier 336 also has an outer peripheral portion 336b which receives a second gear ring 360 which is provided with internal teeth 362 on its inner circumference. The shape of the ring 360 is similar to the ring 338. The gear ring 360 is also secured in place by an annular plate 364 which in turn is located by bolts 366. Pawls 361 are secured to an outer carrier 370 by pivot pins 372 which pass through an annular lug 374 of the carrier 372. The outer carrier 370 is secured to the hub 300 to transmit drive to the hub 300 as will be described hereinafter.

The outer circumferences of the gear rings 338 and 360 are spaced from the outer case 328a and the outer peripheral portion 336b of the carrier 336 respectively. A resilient rubber ring 380 is provided between the outer periphery of the gear ring 338 and the outer casing portion 328a as is best shown in FIG. 11. The rubber ring 380 has a shape which matches the outer contour of the gear ring 338 as is apparent from FIG. 11. A similar rubber ring 382 is provided between the gear ring 360 and the outer peripheral portion 336b of the carrier 336.

The casing portion 328b of the outer casing 328 is mounted on bearings 390 to the inner carrier 370 when drive is applied to the outer casing 328 by a chain applied to the sprocket 334 which in turn is rotated by a person pedalling a bicycle or by applying some other input drive to the sprocket 328 should the transmission be used in another environment, the outer casing 328 rotates on outer carrier 370 by virtue of the bearing arrangement 390 and on the gear changer 325 by virtue of the bearings 326. Rotation of the casing 328 carries the gear ring 338 with it so that the gear ring 338 rotates for example in the direction of arrow H in FIG. 11. The gear ratio of the transmission mechanism is set by the cable 324 which may be secured to a suitable control lever or knob on the handle of a bicycle or elsewhere in other applications so that upon movement of the handle, the cable 324 is moved to rotate the gear changer 325. Rotation of the gear changer 325 rotates the outer concentric 320 by virtue of the arrangement of the pin 323 projecting from the outer eccentric 320 into the slot 321 of the gear changer 325. Thus, the outer eccentric 320 is rotated on the inner eccentric 318 to change the eccentricity of the inner and outer eccentrics relative to the axis of the hub 300 and shaft 312. Movement of the eccentric 320 and pin 323 carried by the eccentric 320 is accommodated by the slot 321 in the gear changer 325. Movement of the eccentrics 320 therefore alters the position of the carrier 366 relative to the central axis of the hub 300 and shaft 312 from, for example, the position shown in FIGS. 10 and 11 to a central position where the arrangement is concentric thereby providing a gear ratio of 1:1, to a position 180° out of phase with the position shown in FIGS. 10 and 11. By changing the eccentricity, the ratio of the transmission is altered and alteration of the gear ratio can be infinitely adjustable between the maximum and minimum limits of the transmission.

As the gear ring 338 rotates with the outer casing 328 in the direction of arrow H in FIG. 11, the teeth 350 on the gear ring 338 will be brought into engagement with one of the pawls 344 (for example, the pawl 344' labelling in FIG. 11). The pawls 344 are generally biased outwardly by leaf springs 345 which are secured to the pawls 344. The pawls 344 are provided with abutment stop portions 347 at the end adjacent pins 352 which mount the pawls 326 to the carrier 336 to limit the amount of outward movement of the pawls 344 under the influence of the leaf springs 345. This therefore places the pawls in a suitable position to be engaged by the teeth 350 of the gear ring 338 as the gear ring rotates. When the pawl 334' is engaged by the teeth 350 of the gear ring 338, that pawl is loaded by the gear ring and therefore driven in the direction of arrow H to thereby rotate the carrier 336 on bearings 339 about the outer eccentric 320. The pawls 344 are able to move inwardly against the bias of the springs 345 during rotation about the eccentrics 318 and 320.

The rubber ring 380 provides for differential motion and hence load distribution between at least two of the pawls 344 at any one time in a manner which will be described in greater detail with reference to FIGS. 14 and 15. Briefly, the load distribution is applied by the resilient ring 380 because when the tooth 344' is loaded by the gear ring 338, the gear ring 338 will be moved against the resilience of the ring 380 to bring load onto the next pawl 344" as will be described in more detail with reference to FIGS. 14 and 15.

Rotation of the carrier 336 on bearings 339 therefore rotates the second gear ring 360 in the direction of arrow G in FIG. 12 so that the teeth 362 of the gear ring 360 engage with the pawls 361. The pawls 361 are biased outwardly by leaf springs 345 in the same manner as the pawls 344 and are provided with stops to limit the outward movement in the same manner as the pawls 344. Thus, as the gear ring 360 rotates, the pawls 361 are driven to thereby rotate inner carrier 370 and in turn the hub 300 which is securely fixed to the outer carrier 370. Thus, drive is transmitted from the input sprocket 334 and the outer casing 328 to which the sprocket 334 is connected, to the hub 300 to drive the hub 300. Once again, differential load distribution is applied to the pawls 361 by the ring 382 between the gear ring 360 and the outer peripheral portion 336b of the carrier 336.

FIGS. 14 and 15 illustrate the manner in which differential load distribution is applied between the pawls and with reference to those figures. Using the pawls 344 and the gear ring 338 as an example, as the gear ring 338 rotates in the direction of arrow J in FIG. 14, the pawl 334' is in driving engagement with the gear ring 338. The load which is applied back onto the gear ring 338 by the pawl 334' basically causes the gear ring 338 to undergo a slight rotatory and lateral movement generally in the direction of curved arrow K in FIG. 14. This movement is able to take place by virtue of the resilient rubber ring 380 provided between the gear ring 338 and the outer casing and therefore compression of the rubber ring 380 is able to take place to allow movement of the gear ring 338 a slight amount. The amount of movement is typically in the order of a fraction of a millimetre. The movement repositions the gear ring 338 from the position labelled P1 to the position labelled P2 which in turn brings the portion of the gear ring labelled P3 to the position labelled P4. As is apparent from the enlarged view in FIG. 15, when the gear ring is in the position P3 the pawl 334" is slightly out of engagement with the tooth 350. However, when the gear ring has undergone the movement accommodated by the resilient rubber ring 380 to the position P4, the pawl 334" is picked up by the tooth 350 of the gear ring 338 as shown by position P4 and reference 334'" so that the pawl 334" is loaded by the gear ring and the load is distributed between the pawls 334' and 334".

A further advantage of providing load distribution by way of the rubber ring as described in the embodiments of FIGS. 10 to 13 is that only the amount of load distribution which is actually required is applied. This is because of the load which is originally applied to the ring 334 only moves the ring a certain amount in accordance with that load so that only a certain amount of the load is therefore taken up by the second pawl 334". As the load applied to the pawl 334' increases, the amount of movement of the gear ring 338 can correspondingly increase to thereby increase the load on the pawl 334". If the load is only small, only a very small amount of movement will occur thereby only slightly loading the pawl 334". Thus, only the amount of load distribution which is actually required needs to be taken up. This is in contrast with the earlier embodiments which provide generally a fixed mechanical arrangement for providing the load distribution and in which regardless of the amount of load which is on the initial pawl, a maximum amount of load distribution is always applied to the next pawl.

FIG. 13 shows an embodiment which is similar to FIGS. 10 to 12 except that whereas in the embodiment of FIGS. 10 to 12, the drive was from gear to pawl and then gear to pawl, the drive in this embodiment is from gear to pawl and from pawl to gear. As will be apparent from the detailed description of the embodiment of FIG. 13, a different cyclic arrangement to that previously described is involved. In the embodiment of FIG. 13, power is supplied from a large member (gear ring 338) to a smaller member (pawls 344 and pawl carrier 390) and then from a small member (pawl carrier 390 and pawls 361) to a large member (gear 360). Thus, the cycle is a large to small then small to large cycle. The larger outer ring driving the smaller body by means of the pawls provides an overdrive as would be expected with a large gear engaging and driving a smaller gear. The second part of the cycle in which the small member drives the large member also surprisingly produces an overdrive although if this were a gear system it would produce a reduction. The contact zone of the respective pawls in each part of the cycle is different and occurs in a different position on each cycle of the transmission. It is believed that the overdrive phenomena is produced in the second part of the cycle notwithstanding the transmission of power from a small member to a large member because a virtual gear (not shown) is created which rotates about the centre of the system. Although the virtual gear only exists in the contact zone, it is driven by the gear circle through which the larger outer gear rotates.

In FIG. 13, similar reference numerals designate similar parts as the previous embodiment and the operation of the gear change mechanism and the inner and outer eccentrics is identical to that in the previous embodiment. In this embodiment the outer case portion 328a carries the gear ring 338 as in the earlier embodiment and the gear ring 338 drives pawls 344 as in the earlier embodiment. However, the pawls 344 are connected to a pawl carrier 390 which is mounted on bearings 392 on the inner and outer eccentrics 318 and 320. The second pawls 361 may be mounted on a common pivot pin designated 394 with the adjacent pawl 344 so that when drive is transmitted from the outer case 328 to the gear ring 338 and then to the pawls 344, the pawl carrier 390 is rotated to in turn rotate the pawls 361. The second gear ring 360 is mounted on a gear ring carrier 394 which is fixed to hub 300 so that as the pawls 361 rotate about the axis of hub 300 and shaft 312, the gear ring 360 is picked up by the pawls 361 so that drive is transmitted to the gear ring 360 to in turn drive the gear ring carrier 394 and the hub 300. The resilient rings 380 and 382 described with reference to FIGS. 10 to 12 (not shown in FIG. 13 for ease of illustration) are included between the outer case 328a and the gear ring 338 and between the gear ring 360 and the gear ring 394. In this embodiment the respective pawls and gear rings each drive on different parts of the respective rings so that in this embodiment a greater amount of differential load distribution is able to be applied during movement of the rings. Notwithstanding this arrangement, for some applications an isolating ratchet or other mechanical diode may be included between the input and output elements.

It should be apparent from the gear arrangements and pawl arrangements that in both the embodiments of FIGS. 10 to 12 and 13 it is possible to free wheel backwards so that if the transmission is used in a bicycle and the person stops pedalling, the hub is able to free wheel with the pawls simply riding over the teeth of the gear rings in the reverse direction. Once pedalling takes place, drive is applied to the case 328 so that drive is in turn applied to the hub 300 in the manner described above.

FIGS. 16 and 17 show yet a further embodiment in which differential load distribution is applied by means of a solid ring in a similar manner described to that described in earlier embodiments. In this embodiment hub 300 is mounted on shaft 312 and the gear changer described with reference to the earlier embodiments is omitted for ease of clarity. A fixed inner eccentric 318 is arranged on the shaft 312 and the moveable outer eccentric 320 is arranged on the inner eccentric 318. Case 328 is arranged for rotation of the inner eccentric 318 by virtue of bearings 326 and also by bearings 390 which are arranged between the casing 328 and an output plate 398 which is mounted to the hub 300.

The floating load distribution ring 400 is shown mounted about the outer eccentric 320. The ring 400 may be provided with a generally T-shaped cross-section as can be seen in FIG. 16 and the base 402 of the ring 400 is accommodated in a slot in the outer eccentric 320. The outer eccentric 320 can be provided in two parts 320a and 320b as shown. This simply aids in assembly of the ring 400 onto the eccentric 320. The outer case 328 carries a gear ring 404 and a pawl 406 is arranged for meshing with teeth on the inner circumference of the gear ring 404. Each of the pawls 406 is provided with a pair of links 408 and 410. The links are coupled together by a pin 412. The pawls 406 are also connected to a respective link 408 by a spring 414 so that respective pawls 406 and links 408, 410 pair form a generally V-shape as is shown in FIG. 17.

The pawls 406 are preferably mounted between the respective links 408 and 410 by a pivot pin 416. The links 408 and 410 also carry rollers 418 which roll on the periphery of the load distribution ring 400.

When the sprocket 334 is driven by a chain or the like the case 328 rotates to thereby rotate the gear ring 404 and to bring the teeth of the gear ring 404 into selective engagement with the pawls 406 so that the pawls 406 are driven. The pawls 406 are therefore driven and carry the links 408 and 410 with the pawls. The links 408 and 410 are coupled to the output ring 398 also by the pivot pin 412 which passes through the links 410 and 408 and also through arms 420 and 422 of the output ring 398. The arm 420 of the output ring 398 is secured to the hub 300 so that rotation is imparted to the hub 300 and the other arm 422 is mounted on bearing 493 so that the ring 398 can rotate on the inner eccentric 318.

In this embodiment, the gear change mechanism 325 is different to the previous embodiment. The mechanism 325 comprises a shaft 327 which my be driven by a suitable cable or the like. The shaft 327 carries a gear 329 which meshes with gearing 331 provided on the inner circumference of the eccentricity 320 and in particular on portion 320a. Thus, by rotating gear 329, the eccentricity 320 is driven to change the eccentricity about the axis of the hub 300 and shaft 312 to thereby change the gear ratio. Movement of the eccentric 320 is taken up by spreading the V-shape of the pawl and link pairs 406 and 408/410 against the bias of spring 414.

In the embodiment of FIGS. 16 and 17, because differential load distribution is provided by a solid ring, there is no provision for only applying an amount of load distribution in accordance with the input load on the pawls 406. As soon as ant load is applied to the pawls the load will be distributed to the maximum effect between at least two of the pawls because the ring will move the full amount it is able as soon as any load is applied to it to thereby apply the full amount of load to the adjacent pawl.

FIGS. 18 and 19 show a further embodiment which is similar to the embodiment previously described and similar reference numerals in this embodiment designate the same parts as in the embodiment of FIGS. 16 and 17. This embodiment differs from the previous embodiment in that it includes an amplifying gearing system to amplify the gear ratio provided by the inner and outer eccentricities 318 and 320 of the transmission mechanism. The amplifying gearing system comprises a planet gear 450 which is arranged on a shaft 452. The shaft 452 is carried by the output ring 398 so that when the output ring 398 is rotated by the pawl 406 and links 408 and 410 the planet gears 450 drive a sun gear 454 which is coupled to the hub 300. The gear ratio between the planet gears 450 and 454 determines the amplifying factor for the gear ratio within the transmission mechanism and this amplifying factor can be simply changed by changing the planet gears or sun gears to alter the gear ratio between the planet gears and sun gears 454.

FIG. 20 shows a different embodiment which rather than using pawls which are operating "in compression" that is by pushing a gearing or being pushed by a gear ring, the embodiment of FIG. 20 utilises chain links 500 which are coupled to the outer ring 510 which in turn may be coupled to the case or like which is driven by the sprocket previously described. So that as the outer ring 510 rotates in the direction of arrow J, a gear ring 520 or sprocket arrangement is picked up by the chain links in turn to rotate the sprocket 520 in the direction of arrow J. Thus, the links operate in extension rather than in compression and actually pull or drag the sprocket or gear 520. This embodiment also has the advantage and since chain links are provided, the amount of space provided between the sprocket or gear ring 520 and the ring 510 in the vicinity where the chain links 500 are under load can be reduced because the sprocket can fit into the space within the chain links 500 as is shown in the upper part of FIG. 20. This embodiment would include the differential load distribution and eccentricities providing the gear ratios as in previous embodiments and is illustrated in schematic form merely to illustrate the principle of using chain links as distinct from pawls.

FIGS. 21 to 23 show a further embodiment of the invention which is similar to the embodiment of FIGS. 11 to 12. Similar reference numerals represent similar parts to those described with reference to FIGS. 11 to 12 and operation of this embodiment is identical apart from the load distributing arrangement. In this embodiment of the invention the gear ring is formed in two parts namely an outer gear ring 600 with teeth on its internal periphery and an inner gear ring 603 which has teeth on both its inner and outer periphery. The pawls 344 engage with the teeth 350 on the inner periphery of the inner gear ring 603 and the teeth on the outer periphery of the gear ring 603 generally mesh with the teeth on the inner periphery of the outer gear ring 600. The gear ring 603 is able to move inwardly and outwardly relative to the gear ring 600 to provide load distribution between at least two of the pawls 345 so that when drive is transmitted from the teeth on the outer gear ring 600 to the teeth on the outer periphery of the gear ring 600 to cause the teeth 350 on an inner periphery of the gear ring 603 to engage with a pawl 345, the gear ring 603 is moved slightly to load another of the pawls 344. The outer gear ring shown in FIG. 23 is formed in the identical manner to that described with reference to FIG. 22 an similar reference numerals designate similar parts.

In this embodiment of the invention, the inner gear ring 603 is dimensioned so that it can only move within the confines of one tooth with respect to the outer part of the gear ring 600. Thus, the gear ring 603 cannot rotate in the direction of arrow H more than a pitch of one tooth. In other embodiments, it would be possible to dimension the inner gear ring 603 so that it is able to rotate relative to the outer part 600 of the gear ring so that it not only provides load distribution by virtue of movement relative to the outer part of the gear ring 603 but also causes change in the gear ratio due to rotary movement relative to the gear ring 600.

The outer part of the gear ring 600 is provided with hard rubber shock absorbing members 604 between the outer part of the gear ring 603 and the outer case 328 which provides some slight cushioning effect but holds the outer part 600 of the gear ring relative to the casing 328.

The transmission mechanisms according to the preferred embodiments can be used in a wide variety of applications including bicycle transmissions, winches, windmills, drills and virtually in any environment in which rotary power is to be transmitted from an input to an output. Other applications include providing a transmission between aligned separate engines in ships or other environments where a large amount of power is required.

Furthermore, other arrangements for implementing differential load distribution between a plurality of the secondary members or a single element which can act in this way are also possible. Such arrangements include the use of a chain which interconnects the pawls and which provides load distribution between at least two of the pawls and hydraulic or pneumatic pistons which load the pawls so that at least two of the pawls are loaded at any one time.

In all of the transmissions described with reference to the drawings, the input is via an element which turns about the eccentric which remains stationary with respect to the other elements of the system. Such mechanisms will always produce overdrive transmissions unless the plurality of linking elements are controlled to make engagement in some region other than that automatically selected by the system. If the element previously used as the input is held stationary and the input rotation is applied to and causes the eccentric element to rotate, this form of the transmission will produce a reduction transmission with extremely wide gearing ratio range. Thus within the scope of the invention the eccentric element could be the input or be coupled to the input for rotation and the other element held stationary relative thereto.

Since modifications within the spirit and scope of the invention my readily be effected by persons skilled within the art, it is to be understood that this invention is not limited to the particular embodiment described by way of example hereinabove.

The claims defining the invention are as follows:

1. A transmission mechanism including:
   an input power supply means for supplying input rotary power;
   an output power supply means for providing rotary output power;
   a plurality of secondary members arranged between the input power supply means and the output power supply means for transmitting power from the input power supply means to the output power supply means, each of the plurality of secondary members transmitting power through only part of each rotary cycle of the input power supply means; and
   load distributing means for differentially distributing the load taken by the secondary members between at least two of the secondary members at any one time.

2. The transmission of claim 1 wherein the plurality of secondary members are sliding pawls which are driven by the input power supply means in sequence and for only part of each rotation of the input power supply means and the output power supply means comprises satellite gears driven by the pawls which in turn drive an output sun gear.

3. The transmission of claim 1 wherein the plurality of secondary members are pawls coupled to the input power supply means for rotation with the input power supply means and which engage and drive the output power supply means in sequence and for only part of each rotation of the input power supply means to provide output power.

4. The transmission of claim 1 wherein the load distributing means comprises a lever coupled to each of the secondary members for engaging another of the secondary members so that when load is applied to a secondary member the load is transmitted from that secondary member via the lever to the other secondary member therefore differentially distributing the load between the secondary member and the other secondary member.

5. The transmission of claim 4 wherein the input power supply member comprises a variator and the secondary members comprise a plurality of pawls which are pivotally coupled to the variator, the output power supply member comprising a toothed assembler arranged eccentrically with respect to the variator so that upon rotation of the variator the pawls, in turn, are brought into engagement with the assembler to drive the assembler through part of one rotation of the assembler, the load distributing means comprising a respective lever pivotally coupled to each of the pawls at an end of each pawl remote from the assembler, each lever being pivotally mounted at an intermediate position and having an end for forcing engaging another of the pawls to engage the assembler so that when one pawl engages the assembler and is under load the load is transmitted from that pawl to the lever so that the lever pivots about its intermediate pivot point and forces the other pawl so that the other pawl is brought into engagement with the assembler to share the load between the pawl and the said other pawl.

6. The transmission of claim 1 wherein the load distributing means comprises a loosely coupled ring, having teeth on its inner and outer circumference, which can rock backwards and forward so as to engage at least two of the secondary members so that the load is distributed between those two secondary members.

7. The transmission of claim 1 wherein the load distribution means comprises a biasing member which enables movement to occur between the input power supply means and the plurality of secondary members and/or the output power supply means and the plurality of secondary members, said movement being caused by engagement of one of the secondary members with the input power supply means or the output power supply means to cause another of the secondary members to therefore engage with the input power supply means or the output power supply means to thereby load the other secondary member.

8. The transmission of claim 7 wherein the biasing means comprises a resilient rubber member.

9. The transmission of claim 1 wherein the transmission includes an infinitely variable gear ratio change mechanism for providing infinite gear ratio alteration between a minimum ratio and a maximum ratio.

10. The transmission of claim 9 wherein the mechanism comprises a stationary eccentric mounted with respect to the plurality of secondary members such that the plurality of secondary members are able to rotate relative to the stationary eccentric; a movable eccentric arranged for movement relative to the stationary eccentric and the plurality of secondary members such that movement of the movable eccentric alters the eccentricity of the stationary and movable eccentrics to thereby change the gear ratio between the maximum and minimum ratios.

11. The transmission of claim 1 wherein the input power supply member comprises two toothed assemblers each associated with a plurality of secondary members and the load distribution means comprises a gear system so that when one of the secondary members associated with one of the assemblers is under load the gear system is driven to attempt to rotate the other assembler so that a secondary member associated with the other assembler is placed under load to thereby share the load between the secondary member associated with one of the assemblers and a secondary member associated with the other of the assemblers.

12. A transmission mechanism including:
   an input power supply means for supplying rotary input power;
   a first assembler;
   a second assembler;
   a first plurality of secondary members arranged between the input power supply means and the first assembler;
   a second plurality of secondary members arranged between the input power supply means and the second assembler;
   an output power supply means; and
   a gearing system arranged between the first and second assemblers and the output power supply means for transmitting power supplied to at least one of the first and second assemblers by a respective one of the first and second plurality of secondary members from the at least one assembler to the output power supply means, wherein the gearing system also provides a load distributing means for distributing load applied to the secondary members so that the load is shared between at least two of the secondary members at any one time, and most preferably the first and second assemblers and the gearing system also provides differential motion exchange between the first and second assemblers to provide a continuous output power supply.

13. The transmission of claim 12 wherein the load is shared between one of the secondary members in the first plurality of secondary members and one of the secondary members in the second plurality of secondary members.

14. A transmission mechanism including:

an input drive member for receiving input rotary power;

a first gear ring coupled to the input drive member;

an output drive member for providing output rotary power;

a plurality of secondary power supply members being coupled to the output drive member;

an eccentric member for mounting the plurality of secondary members and which is rotatable to alter the eccentricity of the eccentric member relative to a central axis to thereby change the position of the first gear ring with respect of the secondary members to alter the gear ratio between the first gear ring and the secondary members;

wherein the first gear ring is mounted for rotation with the input drive member, the first gear ring having teeth on an inner circumference thereof;

the plurality of secondary power supply members including a first plurality of secondary members arranged within the first gear ring on the eccentric member for engagement by the teeth of the first gear ring when the first gear ring rotates so that each of the first plurality of secondary members is engaged by the first gear ring for part of each rotary cycle of the first gear ring;

a carrier member for carrying the first plurality of secondary members;

a second gear ring carried by the carrier member, the second gear ring having teeth on an internal circumference thereof, and the plurality of secondary power supply members further including a second plurality of secondary members arranged within the second gear ring for engagement with the gear ring through only part of each rotary cycle of the secondary gear ring, said second plurality of secondary members being coupled to the output drive member for providing output rotary drive, wherein a biasing member is arranged between the first gear ring and the input drive member and/or a second biasing member is arranged between the carrier and the second gear ring for allowing movement of the first gear ring and/or second gear ring with respect to the first plurality of secondary members and/or the second plurality of secondary members respectively so that when the first and/or second gear ring is loaded by coming into contact with one of the secondary members, the first and/or second gear ring is able to move to come into contact with another of the secondary members to thereby distribute the load between the first secondary member and the said another of the secondary members so that at least two of the secondary members are loaded at any one time.

15. The transmission according to claim 14 wherein a gear ring having teeth on an inner circumference thereof is coupled to the input drive member and a first plurality of secondary members are arranged within the first gear ring, the first plurality of secondary members being coupled to a second plurality of secondary members, a second gear ring arranged around the second plurality of secondary members and the second gear ring being coupled by a coupling member to the output drive member for providing output rotary power.

16. A transmission mechanism including:

an input power supply for supplying input rotary power;

an output power supply for providing rotary output power;

a plurality of secondary members arranged between the input power supply and the output power supply for transmitting power from the input power supply to the output power supply;

an eccentric member for mounting the plurality of secondary members with respect to the input power supply or the output power supply for setting a drive ratio between the input power supply and the output power supply;

the plurality of secondary members transmitting power through only part of each rotary cycle of the input power supply except for when the drive ratio between the input power supply and the output power supply is 1:1; and load distributing means for differentially distributing the load taken by the secondary members between at least two of the secondary members at any one time.

17. The transmission of claim 16 wherein the eccentric member comprises a stationary eccentric and a movable eccentric arranged, the movable eccentric being movable relative to the stationary eccentric to adjust the eccentricity of the eccentric member to in turn adjust the position of the secondary members relative to the input power supply or the output power supply, and drive ratio change means for adjusting the position of the movable eccentric.

18. The transmission of claim 16 wherein the plurality of secondary members are mounted on the movable eccentric and wherein operation of the drive ratio change means moves the movable eccentric to in turn move the secondary members with respect to the input power supply to adjust the drive ratio.

19. A transmission including:

an input power supply for receiving input rotary power;

an output power supply for supplying output rotary, power;

a first gear ring couple to the input power supply for rotation with the input power supply, the first gear ring having teeth on an inner peripheral surface thereof, an eccentric member for setting a drive ratio between the input power supply and the output power supply;

a pawl carrier mounted on the eccentric member for rotation about the eccentric member, the pawl carrier having a first carrier section and a second carrier section axially and radially outwardly spaced from the first carrier section;

a first plurality of pawls coupled to the first carrier section of the pawl carrier for engagement by the teeth of the first gear ring for rotating the pawl carrier;

a second gear ring coupled to the second section of the pawl carrier, the second gear ring having teeth on an inner peripheral surface thereof; and a second plurality of pawls coupled to the output power supply for engagement by the teeth of the second gear ring upon rotation of the pawl carrier to thereby rotate the second plurality of pawls and the output power supply, wherein a load distributing means is provided for differentially distributing the load between at least two pawls of the first plurality of pawls at any one time.

20. The transmission of claim 19 wherein the eccentric member comprises a fixed inner eccentric and a movable outer eccentric mounted on the fixed eccentric, and drive ratio change means for moving the movable eccentric to alter the eccentricity of the eccentric member and therefore the position of the pawl carrier and the first plurality of pawls with respect to the first gear ring to thereby change the drive ratio of the transmission.

21. The transmission of claim 19 wherein the load distributing means comprises a resilient ring between the first gear ring and the input power supply for allowing movement of the first gear ring relative to the first plurality of pawls when one of the first plurality of pawls is loaded to cause the first gear ring to engage another of the first plurality of pawls so that that pawl is also loaded.

22. The transmission of claim 19 wherein the input power supply comprises an outer casing having a power input portion, the outer casing being mounted for rotation relative to the eccentric member.

23. The transmission of claim 22 wherein the power input portion is a sprocket.

24. The transmission of claim 19 wherein the output power supply comprises a second pawl carrier for carrying the second plurality of pawls and an output shaft coupled to the second pawl carrier.

25. A transmission including:

an input power supply for receiving input rotary power;

an output power supply for providing output rotary power;

a first gear ring coupled to the input power supply for rotation with the input power supply, the first gear ring having teeth on an inner periphery thereof;

an eccentric member for setting a drive ratio between the input power supply and the output power supply;

a pawl carrier mounted on the eccentric member and having a first carrier section and a second carrier section axially spaced from the first carrier section;

a first plurality of pawls mounted to the first carrier section of the pawl carrier for engagement by the teeth of the first gear ring for rotating the first plurality of pawls and therefore the pawl carrier;

a second plurality of pawls mounted to the second carrier section of the pawl carrier for rotation with the pawl carrier; and a second gear ring having teeth on an inner periphery thereof for engagement with the second plurality of pawls to thereby rotate the second gear ring, the second gear ring being coupled to the output power supply for providing output rotary power, wherein a load distributing means is provided for differentially distributing the load between at least two pawls of the first plurality of pawls at any one time.

26. The transmission of claim 25 wherein the eccentric member comprises a stationary inner eccentric and a movable eccentric mounted relative to the stationary eccentric, and drive ratio change means for moving the movable eccentric to alter the eccentricity of the eccentric member and therefore the position of the pawl carrier and the first plurality of pawls with respect to the first gear ring to thereby change the drive ratio of the transmission.

27. A transmission including:

an input power supply for receiving input rotary power;

an output power supply for providing output rotary power;

a first gear ring coupled to the input power supply for rotation with the input power supply; the first gear ring having teeth on an inner periphery thereof;

an eccentric member for setting a drive ratio between the input power supply and the output power supply;

a pawl carrier mounted on the eccentric member and having a first carrier section and a second carrier section axially spaced from the first carrier section;

a first plurality of pawls mounted to the first carrier section of the pawl carrier for engagement by the teeth of the first gear ring for rotating the first plurality of pawls and therefore the pawl carrier;

a second plurality of pawls mounted to the second carrier section of the pawl carrier for rotation with the pawl carrier; and a second gear ring having teeth on an inner periphery thereof for engagement with the second plurality of pawls to thereby rotate the second gear ring, the second gear ring being coupled to the output power supply for providing output rotary power, wherein the eccentric member comprises a stationary inner eccentric and a movable eccentric mounted relative to the stationary eccentric, and drive ratio change means for moving the movable eccentric to alter the eccentricity of the eccentric member and therefore the position of the pawl carrier and the first plurality of pawls with respect to the first gear ring to thereby change the drive ratio of the transmission, wherein the load distributing means comprises a resilient ring between the first gear ring and the input power supply for allowing movement of the first gear ring relative to the first plurality of pawls when one of the first plurality of pawls is loaded to cause the first gear ring to engage another of the first plurality of pawls so that that pawl is also loaded.

28. A transmission including:

an input power supply for receiving input rotary power;

an output power supply for providing output rotary power;

a gear ring having teeth on an inner periphery thereof for rotation with the input power supply;

an eccentric member for setting a drive ratio between the input power supply and the output power supply;

a pawl carrier for carrying a plurality of pawls mounted on the eccentric member;

a plurality of pawls mounted on the pawl carrier for engagement by the teeth of the gear ring to drive the pawl carrier, the pawl carrier being coupled to the output power supply for proving the output rotary power; and a load distributing means is provided for differentially distributing the load between at least two pawls of the first plurality of pawls at any one time.

29. The transmission of claim 28 wherein the output power supply includes a gear system for transforming the drive ratio set by the eccentric member.

30. The transmission of claim 28 wherein the eccentric member comprises a stationary inner eccentric and a movable outer eccentric mounted relative to the eccentric, and drive ratio change means for moving the movable eccentric to alter the eccentricity of the eccentric member and therefore the position of the pawl carrier and the first plurality of pawls with respect to the first gear ring to thereby change the drive ratio of the transmission.

31. The transmission of claim 1, 12, 16, 19, 25, or 29 wherein the load distributing means, which differentially distributes the load, collapses kinematic forms of overlapping partial circular or non-circular motions and serially links associated load functions by differentially distributing the load between the at least two of the secondary members.

* * * * *